US012684320B2

(12) United States Patent　　　(10) Patent No.:　　US 12,684,320 B2
Griot et al.　　　　　　　　　　　(45) Date of Patent:　　***Jul. 14, 2026

(54) TECHNIQUES FOR ESTABLISHING CONNECTIVITY TO A SERVICE-BASED NETWORK VIA A RADIO ACCESS NETWORK

(71) Applicant: QUALCOMM Incorporated, San Diego, CA (US)

(72) Inventors: Miguel Griot, La Jolla, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 739 days.

This patent is subject to a terminal disclaimer.

(21) Appl. No.: 18/061,952

(22) Filed: Dec. 5, 2022

(65) Prior Publication Data

US 2024/0187829 A1　　Jun. 6, 2024

(51) Int. Cl.
| | |
|---|---|
| *H04W 76/10* | (2018.01) |
| *H04L 5/00* | (2006.01) |
| *H04W 4/20* | (2018.01) |
| *H04W 4/50* | (2018.01) |
| *H04W 8/24* | (2009.01) |

(52) U.S. Cl.
CPC ............. *H04W 4/50* (2018.02); *H04L 5/0044* (2013.01); *H04W 4/20* (2013.01); *H04W 8/24* (2013.01)

(58) Field of Classification Search
CPC .......... H04W 4/20; H04W 8/24; H04W 4/50; H04W 76/16; H04W 48/12; H04W 88/06; H04W 88/085; H04L 69/18; H04L 45/85; H04L 69/08; H04L 5/0044
See application file for complete search history.

(56) References Cited

U.S. PATENT DOCUMENTS

| | | | | |
|---|---|---|---|---|
| 12,068,848 B2 * | 8/2024 | Goldhamer | ........... | H04L 1/0063 |
| 12,396,043 B2 * | 8/2025 | Griot | ....................... | H04W 4/50 |

(Continued)

OTHER PUBLICATIONS

Partial International Search Report—PCT/US2023/078997—ISA/EPO—Feb. 23, 2024.

(Continued)

*Primary Examiner* — Congvan Tran

(74) *Attorney, Agent, or Firm* — Holland & Hart LLP

(57)　　　　ABSTRACT

Methods, systems, and devices for wireless communications are described. A user equipment (UE) may be configured to receive, from a distributed unit (DU) associated with a first radio access technology (RAT) of a radio access network (RAN), control information indicating a core network service offered by a service-based network associated with a second RAT. The UE may transmit, via the first RAT, a service request indicating the core network service offered by the service-based network associated with the second RAT. The UE may receive, from the DU, control signaling indicating a service configuration for communicating with the core network service offered by the service-based network. The UE may then transmit, to the DU via the first RAT and in accordance with the service configuration, a service message including a payload associated with the core network service, the payload in a format associated with the second RAT.

30 Claims, 16 Drawing Sheets

(56) References Cited

U.S. PATENT DOCUMENTS

| 2021/0329723 | A1 | | 10/2021 | Teyeb et al. | |
| 2022/0104164 | A1 | | 3/2022 | Kedalagudde et al. | |
| 2024/0187914 | A1 | * | 6/2024 | Koskinen | H04W 72/53 |
| 2024/0314813 | A1 | * | 9/2024 | Panzner | H04W 72/40 |
| 2025/0374092 | A1 | * | 12/2025 | Zhang | H04L 69/28 |
| 2025/0374174 | A1 | * | 12/2025 | Tiwari | H04L 45/851 |

OTHER PUBLICATIONS

International Search Report and Written Opinion—PCT/US2023/078997—ISA/EPO—Apr. 19, 2024.
Samsung: "5G Standalone Architecture", Samsung Technical White Paper, Jan. 7, 2021, 22 Pages, XP055977484, Abstract, Figures 3, 4, Paragraph [0092]—Paragraph [0093].

* cited by examiner 130    105    115

Network
Entity

Transceiver          Antenna 1310                 1315

Communications
Manager

Memory

Code

1330

1320      1340      1325

Processor

1335

1305

1300

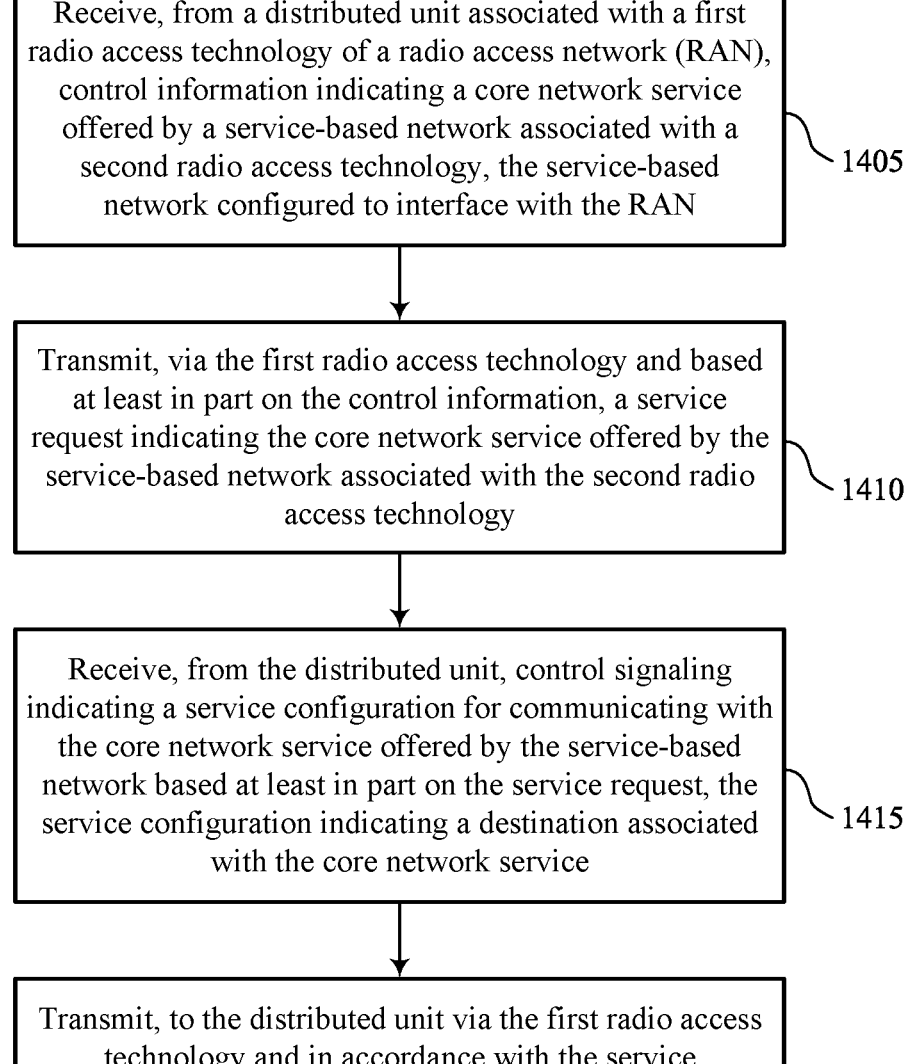

Receive, from a distributed unit associated with a first radio access technology of a radio access network (RAN), control information indicating a core network service offered by a service-based network associated with a second radio access technology, the service-based network configured to interface with the RAN
〜1405

Transmit, via the first radio access technology and based at least in part on the control information, a service request indicating the core network service offered by the service-based network associated with the second radio access technology
〜1410

Receive, from the distributed unit, control signaling indicating a service configuration for communicating with the core network service offered by the service-based network based at least in part on the service request, the service configuration indicating a destination associated with the core network service
〜1415

Transmit, to the distributed unit via the first radio access technology and in accordance with the service configuration, a service message including the destination and payload associated with the core network service, the payload in a format associated with the second radio access technology
〜1420

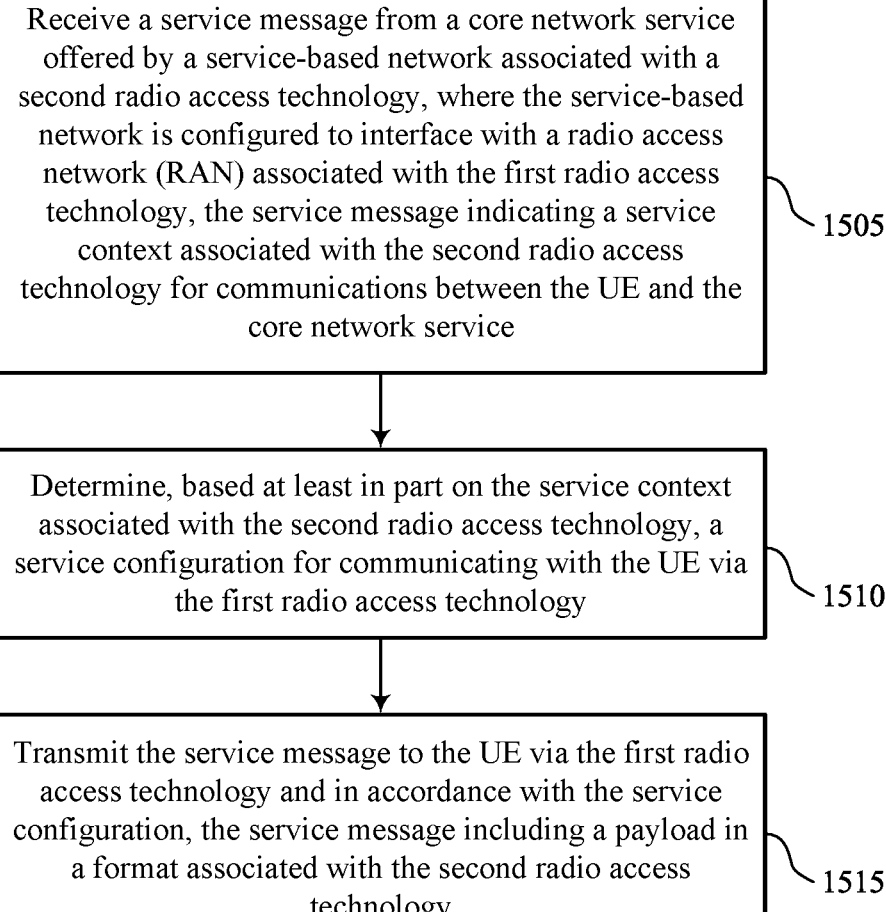

Receive a service message from a core network service offered by a service-based network associated with a second radio access technology, where the service-based network is configured to interface with a radio access network (RAN) associated with the first radio access technology, the service message indicating a service context associated with the second radio access technology for communications between the UE and the core network service

1505

Determine, based at least in part on the service context associated with the second radio access technology, a service configuration for communicating with the UE via the first radio access technology

1510

Transmit the service message to the UE via the first radio access technology and in accordance with the service configuration, the service message including a payload in a format associated with the second radio access technology

Figure 16:
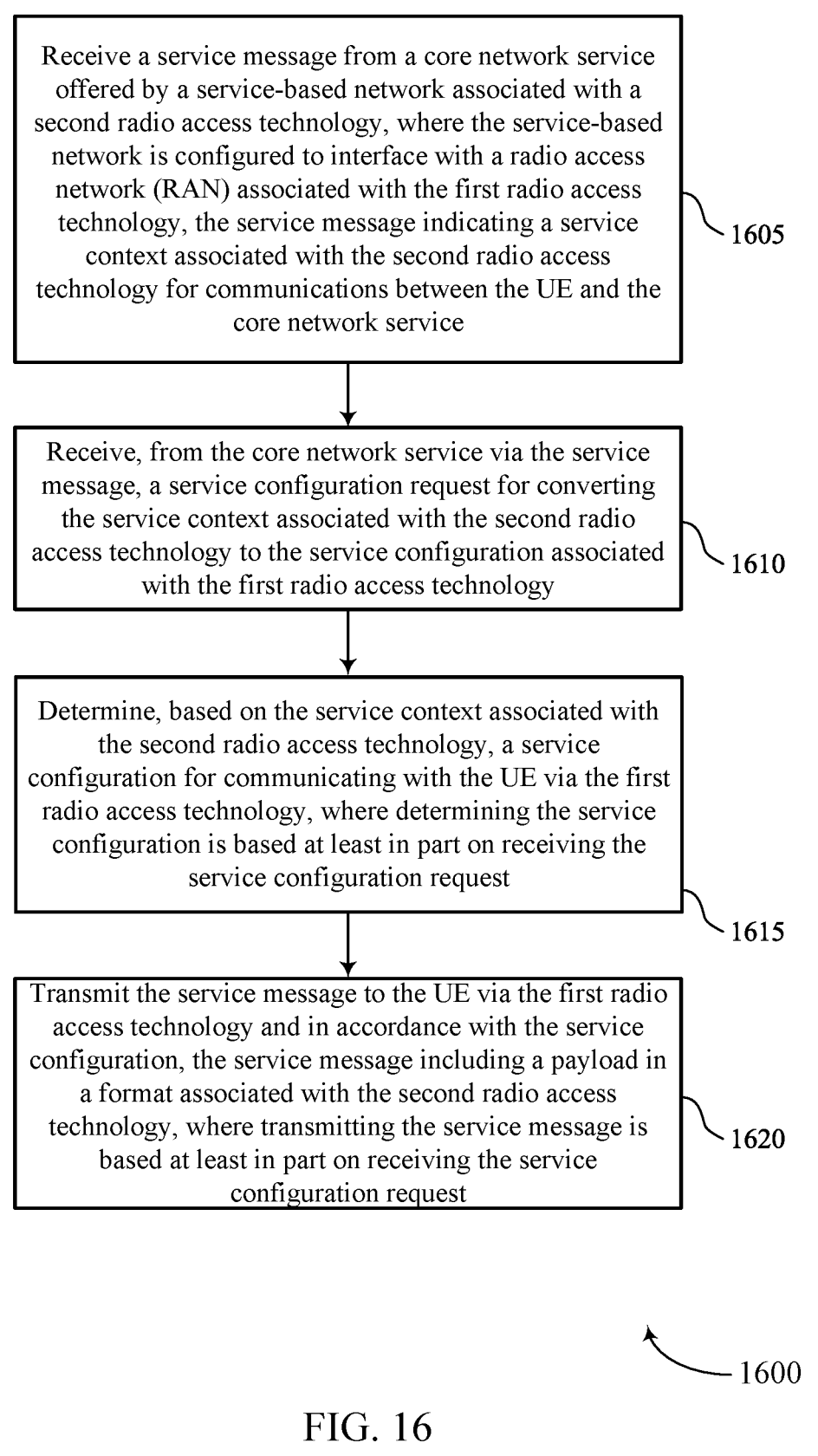

Receive a service message from a core network service offered by a service-based network associated with a second radio access technology, where the service-based network is configured to interface with a radio access network (RAN) associated with the first radio access technology, the service message indicating a service context associated with the second radio access technology for communications between the UE and the core network service ⟍ 1605

Receive, from the core network service via the service message, a service configuration request for converting the service context associated with the second radio access technology to the service configuration associated with the first radio access technology ⟍ 1610

Determine, based on the service context associated with the second radio access technology, a service configuration for communicating with the UE via the first radio access technology, where determining the service configuration is based at least in part on receiving the service configuration request ⟍ 1615

Transmit the service message to the UE via the first radio access technology and in accordance with the service configuration, the service message including a payload in a format associated with the second radio access technology, where transmitting the service message is based at least in part on receiving the service configuration request ⟍ 1620

TECHNIQUES FOR ESTABLISHING CONNECTIVITY TO A SERVICE-BASED NETWORK VIA A RADIO ACCESS NETWORK

FIELD OF TECHNOLOGY

The following relates to wireless communications, including techniques for establishing connectivity to a service-based network via a radio access network (RAN).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In the context of a service-based wireless system, a random access network (RAN) may interface with a service-based network that offers or provides various core network services. However, some network entities (e.g., distributed units (DUs)) may be unable to perform wireless communications using radio access technologies (RATs) associated with core network services of a service-based network.

SUMMARY

The described techniques relate to improved methods, systems, devices, and apparatuses that support techniques for establishing connectivity to a service-based network via a radio access network (RAN). Generally, aspects of the present disclosure are directed to signaling and mechanisms that enable distributed units (DUs) associated with a first radio access technology (RAT), such as a Fifth Generation (5G) RAT, to utilize signaling of the first RAT to facilitate services provided via a second RAT, such as a Sixth Generation (6G) RAT. In other words, aspects of the present disclosure are directed to techniques that enable 6G communications to be performed over a 5G network in order to facilitate migration to 6G services. For example, a 5G DU may include a 5G/6G adaptor component (which may include hardware and/or software) that interfaces with 6G services, and translates 6G signaling into 5G signaling, and vice versa. For instance, the 5G/6G adaptor may receive 6G communications from 6G services, and configure the DU (via an F1 interface) with a 5G service configuration for relaying the 6G information to a user equipment (UE) via 5G signaling. Conversely, the 5G DU may receive 5G signaling from the UE intended for 6G services, and may convey the 5G signaling to the 5G/6G adaptor via the F1 service so that the 5G/6G adaptor can format the signaling into a 6G format for relaying to the applicable 6G services.

A method is described. The method may include receiving, from a DU associated with a first RAT of a RAN, control information indicating a core network service offered by a service-based network associated with a second RAT, the service-based network configured to interface with the RAN, transmitting, via the first RAT and based on the control information, a service request indicating the core network service offered by the service-based network associated with the second RAT, receiving, from the DU, control signaling indicating a service configuration for communicating with the core network service offered by the service-based network based on the service request, the service configuration indicating a destination associated with the core network service, and transmitting, to the DU via the first RAT and in accordance with the service configuration, a service message including the destination and payload associated with the core network service, the payload in a format associated with the second RAT.

An apparatus is described. The apparatus may include a processor, memory coupled with the processor, and instructions stored in the memory. The instructions may be executable by the processor to cause the apparatus to receive, from a DU associated with a first RAT of a RAN, control information indicating a core network service offered by a service-based network associated with a second RAT, the service-based network configured to interface with the RAN, transmit, via the first RAT and based on the control information, a service request indicating the core network service offered by the service-based network associated with the second RAT, receive, from the DU, control signaling indicating a service configuration for communicating with the core network service offered by the service-based network based on the service request, the service configuration indicating a destination associated with the core network service, and transmit, to the DU via the first RAT and in accordance with the service configuration, a service message including the destination and payload associated with the core network service, the payload in a format associated with the second RAT.

Another apparatus is described. The apparatus may include means for receiving, from a DU associated with a first RAT of a RAN, control information indicating a core network service offered by a service-based network associated with a second RAT, the service-based network configured to interface with the RAN, means for transmitting, via the first RAT and based on the control information, a service request indicating the core network service offered by the service-based network associated with the second RAT, means for receiving, from the DU, control signaling indicating a service configuration for communicating with the core network service offered by the service-based network based on the service request, the service configuration indicating a destination associated with the core network service, and means for transmitting, to the DU via the first RAT and in accordance with the service configuration, a service message including the destination and payload associated with the core network service, the payload in a format associated with the second RAT.

A non-transitory computer-readable medium storing code is described. The code may include instructions executable by a processor to receive, from a DU associated with a first RAT of a RAN, control information indicating a core network service offered by a service-based network associated with a second RAT, the service-based network configured to interface with the RAN, transmit, via the first RAT and based on the control information, a service request indicating the core network service offered by the service-based network associated with the second RAT, receive, from the DU, control signaling indicating a service configuration for communicating with the core network service offered by the service-based network based on the service request, the service configuration indicating a destination associated with the core network service, and transmit, to the DU via the first RAT and in accordance with the service configuration, a service message including the destination and payload associated with the core network service, the payload in a format associated with the second RAT.

Some examples of the method, apparatuses, and non-transitory computer-readable medium described herein may further include operations, features, means, or instructions for receiving, from the DU, a system information block (SIB) message including the control information, where the SIB message may be received via the first RAT.

Some examples of the method, apparatuses, and non-transitory computer-readable medium described herein may further include operations, features, means, or instructions for transmitting, to the DU via the first RAT, capability signaling indicating a capability of the user equipment (UE) to communicate with core network services offered by the service-based network associated with the second RAT, where receiving the control information may be based on the capability signaling.

Some examples of the method, apparatuses, and non-transitory computer-readable medium described herein may further include operations, features, means, or instructions for establishing, based on operating in a dual connectivity state, a wireless connection with a second DU associated with the second RAT, where the second DU may be communicatively couplable to at least a second core network service offered by the service-based network and transmitting, to the second DU via the second RAT, a second service message including a second destination associated with the second core network service, the service message further including additional service data associated with the second core network service, the additional service data including an additional payload in the format associated with the second RAT.

Some examples of the method, apparatuses, and non-transitory computer-readable medium described herein may further include operations, features, means, or instructions for receiving, from the second DU, second control signaling indicating a service context for communicating with the second core network service via the second RAT, where the second service message may be transmitted in accordance with the service context.

In some examples of the method, apparatuses, and non-transitory computer-readable medium described herein, the service request and the service message may be transmitted via one or more communication layers associated with the first RAT, the one or more communication layers including a physical (PHY) layer, a medium access control (MAC) layer, a radio link control (RLC) layer, or any combination thereof.

In some examples of the method, apparatuses, and non-transitory computer-readable medium described herein, the service request, the service message, or both, may be transmitted to the DU for relay to the destination associated with the core network service.

In some examples of the method, apparatuses, and non-transitory computer-readable medium described herein, the first RAT includes a 5G RAT, a New Radio (NR) access technology, or both, and the second RAT includes a 6G RAT.

A method is described. The method may include receiving a service message from a core network service offered by a service-based network associated with a second RAT, where the service-based network is configured to interface with a RAN associated with the first RAT, the service message indicating a service context associated with the second RAT for communications between the UE and the core network service, determining, based on the service context associated with the second RAT, a service configuration for communicating with the UE via the first RAT, and transmitting the service message to the UE via the first RAT and in accordance with the service configuration, the service message including a payload in a format associated with the second RAT.

An apparatus is described. The apparatus may include a processor, memory coupled with the processor, and instructions stored in the memory. The instructions may be executable by the processor to cause the apparatus to receive a service message from a core network service offered by a service-based network associated with a second RAT, where the service-based network is configured to interface with a RAN associated with the first RAT, the service message indicating a service context associated with the second RAT for communications between the UE and the core network service, determine, based on the service context associated with the second RAT, a service configuration for communicating with the UE via the first RAT, and transmit the service message to the UE via the first RAT and in accordance with the service configuration, the service message including a payload in a format associated with the second RAT.

Another apparatus is described. The apparatus may include means for receiving a service message from a core network service offered by a service-based network associated with a second RAT, where the service-based network is configured to interface with a RAN associated with the first RAT, the service message indicating a service context associated with the second RAT for communications between the UE and the core network service, means for determining, based on the service context associated with the second RAT, a service configuration for communicating with the UE via the first RAT, and means for transmitting the service message to the UE via the first RAT and in accordance with the service configuration, the service message including a payload in a format associated with the second RAT.

A non-transitory computer-readable medium storing code is described. The code may include instructions executable by a processor to receive a service message from a core network service offered by a service-based network associated with a second RAT, where the service-based network is configured to interface with a RAN associated with the first RAT, the service message indicating a service context associated with the second RAT for communications between the UE and the core network service, determine, based on the service context associated with the second RAT, a service configuration for communicating with the UE via the first RAT, and transmit the service message to the UE via the first RAT and in accordance with the service configuration, the service message including a payload in a format associated with the second RAT.

Some examples of the method, apparatuses, and non-transitory computer-readable medium described herein may further include operations, features, means, or instructions for receiving, from the core network service via the service message, a service configuration request for converting the service context associated with the second RAT to the service configuration associated with the first RAT, where determining the service configuration and transmitting the service message may be based on receiving the service configuration request.

Some examples of the method, apparatuses, and non-transitory computer-readable medium described herein may further include operations, features, means, or instructions for transmitting, to the UE via the first RAT, a SIB message indicating the core network service offered by the service-based network, receiving, from the UE via the first RAT and based on the SIB message, a service request indicating the core network service, and transmitting the service request to a destination associated with the core network service and via the second RAT, where receiving the service message may be based on transmitting the service request.

Some examples of the method, apparatuses, and non-transitory computer-readable medium described herein may further include operations, features, means, or instructions for receiving, from the UE via the first RAT, capability signaling indicating a capability of the UE to communicate with core network services offered by the service-based network associated with the second RAT, where transmitting the SIB message may be based on the capability signaling.

In some examples of the method, apparatuses, and non-transitory computer-readable medium described herein, the service message may be received via an adaptor component of the DU, the adaptor component may be configured to interface with the service-based network and translate communications between the first RAT and the second RAT, and the adaptor component includes hardware components, software components, or both.

Some examples of the method, apparatuses, and non-transitory computer-readable medium described herein may further include operations, features, means, or instructions for transmitting, the core network service, control signaling indicating application programming interface information associated with the DU, where the service message may be received via the second RAT in accordance with the application programming interface information.

In some examples of the method, apparatuses, and non-transitory computer-readable medium described herein, the service message may be transmitted via one or more communication layers associated with the first RAT, the one or more communication layers including a PHY layer, a MAC layer, an RLD layer, or any combination thereof.

In some examples of the method, apparatuses, and non-transitory computer-readable medium described herein, the first RAT includes a 5G RAT, an NR access technology, or both, and the second RAT includes a 6G RAT.

BRIEF DESCRIPTION OF THE DRAWINGS

FIGS. 14 through 16 illustrate flowcharts showing methods that support techniques for establishing connectivity to a service-based network via a RAN in accordance with one or more aspects of the present disclosure.

DETAILED DESCRIPTION

Figure 1:
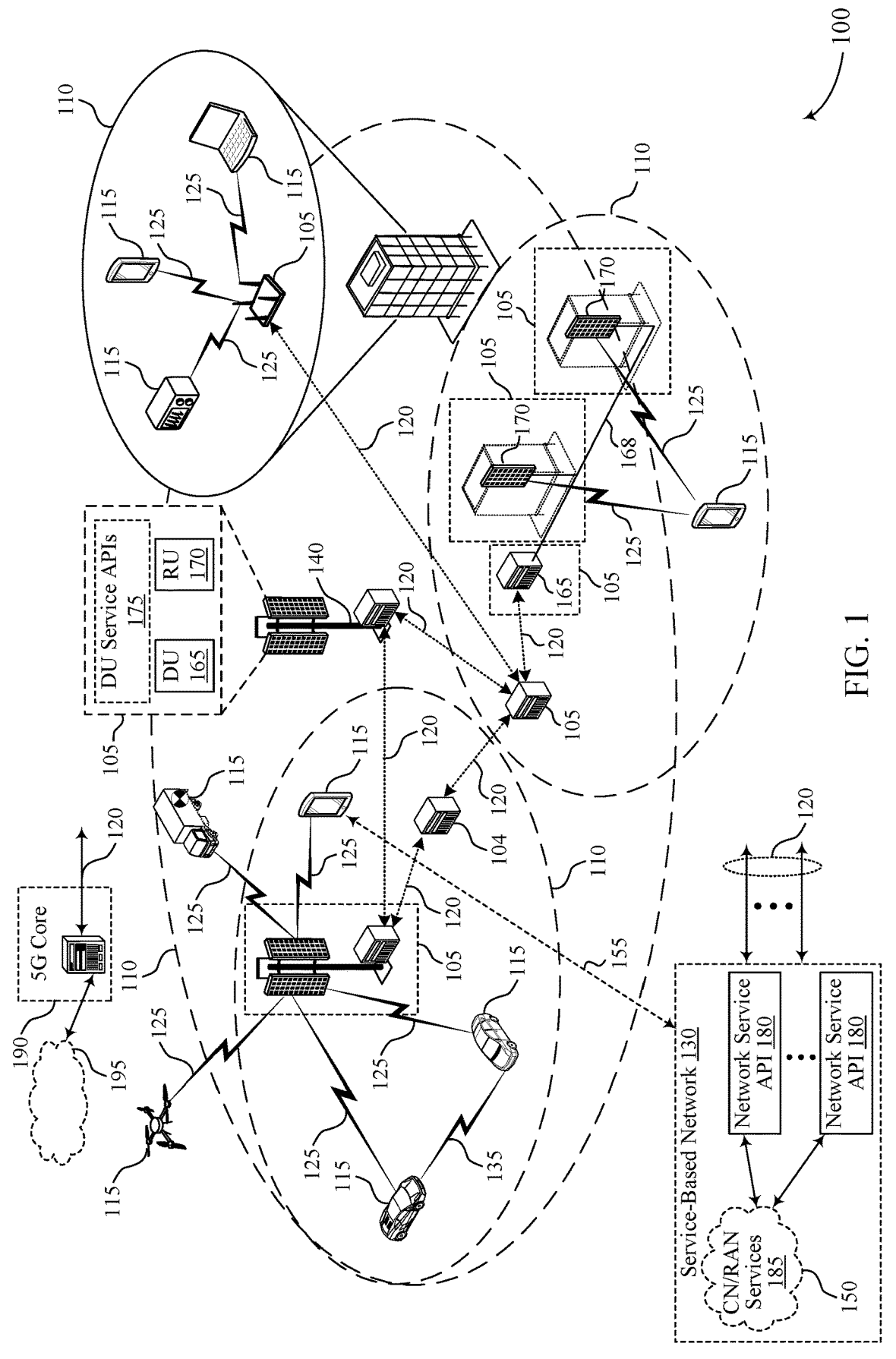
FIG. 1 illustrates an example of a wireless communications system that supports techniques for establishing connectivity to a service-based network via a radio access network (RAN) in accordance with one or more aspects of the present disclosure.

Some wireless systems may exhibit a relatively vertical, hierarchical architecture that includes many "layers" of different devices that perform functions for the system. For example, a wireless system may include user equipments (UEs), base stations/network entities, and numerous back-end (e.g., core network) devices associated with one or more functions for the system. Such a hierarchical structure may result in processing and other functions being performed at multiple devices (e.g., duplicative processing or capabilities across multiple back-end devices), thereby leading to wasted resources and excess power consumption. Additionally, the back-end architecture of some wireless systems may be owned and maintained by a small handful of operators, which may make it difficult for other parties/entities to integrate with the systems and may complicate the ability of the systems to offer customized services and functionality to wireless devices.

Comparatively, some wireless systems, such as Sixth Generation (6G) systems, may exhibit a flatter, service-based architecture in which a radio access network (RAN) (e.g., network entities) interfaces with a service-based network in order to connect UEs to core network services maintained at various network addresses within the service-based network. In the context of a service-based system, operations and functions that may otherwise be performed by a few centralized back-end components (e.g., in some systems) may be distributed across a number of core network services that may be hosted at different network addresses, such as in a cloud-based architecture. As a result, UEs in a service-based system may be able to establish and maintain connections with (e.g., "subscribe" to) different core network services or groups thereof on an à la carte basis, where each core network service offers or provides a respective network functionality or service. For example, a service-based system may include a mobility service, a security service, a privacy service, a location service, and the like. In this regard, each UE within a service-based system may be able to select to which core network services the UE will subscribe based on the individualized characteristics or needs of the respective UE.

Communication with core network services offered by a service-based network (e.g., 6G or cloud-based network) may require different protocols and communications, which may not be supported by some network entities associated with other RATs, such as 5G RAN nodes including 5G DUs, 5G CUs, etc. Moreover, the development of RAN nodes (e.g., DUs, CUs) that support core network services of a service-based network may require extensive time and investment, which may significantly slow the migration from current RATs to service-based RATs (e.g., migration from 5G to 6G).

Accordingly, aspects of the present disclosure are directed to signaling and mechanisms that enable DUs associated with a first RAT, such as a 5G RAT, to utilize signaling of the first RAT to facilitate services provided via a second RAT, such as a 6G RAT. In other words, aspects of the present disclosure are directed to techniques that enable 6G communications to be performed over a 5G network in order to facilitate migration to 6G services. For example, a 5G DU may include a 5G/6G adaptor component (which may include hardware and/or software) that interfaces with 6G services, and translates 6G signaling into 5G signaling, and vice versa. For instance, the 5G/6G adaptor may receive 6G communications from 6G services, and configure the DU (via an F1 interface) with a 5G service configuration for relaying the 6G information to a UE via 5G signaling. Conversely, the 5G DU may receive 5G signaling from the UE intended for 6G services, and may convey the 5G signaling to the 5G/6G adaptor via the F1 service so that the 5G/6G adaptor can format the signaling into a 6G format for relaying to the applicable 6G services.

Aspects of the disclosure are initially described in the context of wireless communications systems. Additional aspects of the disclosure are described in the context of an example network architecture and an example process flow. Aspects of the disclosure are further illustrated by and described with reference to apparatus diagrams, system diagrams, and flowcharts that relate to techniques for establishing connectivity to a service-based network via a RAN.

FIG. 1 illustrates an example of a wireless communications system 100 that supports techniques for service establishment in a service-based wireless system in accordance with one or more aspects of the present disclosure. The wireless communications system 100 may include one or more network entities 105, one or more UEs 115, and a service-based network 130. In some examples, the wireless communications system 100 may implement aspects of a 6G network, a 5G network (e.g., a New Radio (NR) network), a 4G network (e.g., a Long Term Evolution (LTE) network, an LTE-Advanced (LTE-A) network, an LTE-A Pro network), or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, access point, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the service-based network 130, or with one another, or both. For example, network entities 105 may communicate with the service-based network 130 via one or more backhaul communication links 120 (e.g., in accordance with an S1, N2, N3, or other interface protocol). Similarly, UEs 115 may communicate with the service-based network 130 via one or more communication links 155. In some examples, network entities 105 may communicate with one another via a backhaul communication link 120 (e.g., in accordance with an X2, Xn, or other interface protocol) either directly (e.g., directly between network entities 105) or indirectly (e.g., via a service-based network 130). In some examples, network entities 105 may communicate with one another via one or more communication links such as a fronthaul communication link 168 (e.g., between a radio unit 170 and a distributed unit 165). The backhaul communication links 120 or fronthaul communication links 168, or other communication links between network entities 105, may be or include one or more wired links (e.g., an electrical link, an optical fiber link), one or more wireless links (e.g., a radio link, a wireless optical link), among other examples or various combinations thereof.

In some examples, network entities 105 may communicate with a service platform 150 (e.g., a cloud platform) that provides one or more core network services (CN services), one or more radio access network services (RAN services), or any combinations thereof (CN/RAN services 185). The CN/RAN services may be provided via the service-based network 130, using one or more APIs. For example, one or more DU service APIs 175 may provide an interface for one or more services at a UE 115. The services at the UE 115 may correspond to one or more CN/RAN services 185 at service platform 150. For example, network service APIs 180 at service-based network 130 may interface with corresponding DU service APIs 175 at a DU 165, which interface with corresponding APIs at a UE 115 to provide service connectivity between the one or more UE 115 services and corresponding CN/RAN services 185.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, a 6G NB, or other suitable terminology). In some examples, a network entity 105 (e.g., a base station 140) may be implemented in an aggregated (e.g., monolithic, standalone) base station architecture, which may be configured to utilize a service-based architecture and provide radio access within a single network entity 105 (e.g., a single RAN node, such as a base station 140, may include a RU 170, a DU 165, and DU APIs 175 for CN/RAN services 185). An RU 170 may also be referred to as a radio head, a smart radio head, a remote radio head (RRH), a remote radio unit (RRU), or a transmission reception point (TRP).

Additionally, in some examples, one or more network entities 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), a DU 165, RU 170, a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof. One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between components (e.g., CU, DU, and RU) is flexible and may support different functionalities depending on which functions (e.g., network layer functions, protocol layer functions, baseband functions, RF functions, and any combinations thereof) are performed at a component. For example, a functional split of a protocol stack may be employed between a CU and a DU 165 such that the CU may support one or more layers of the protocol stack and the DU 165 may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). In some examples, the CU may host one or more service APIs for one or more CN/RAN services 185 via corresponding network service APIs 180 of service-based network 130. The CU may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU and a DU 165, or between a DU 165 and an RU 170 may be within a protocol layer (e.g., some functions for a protocol layer may be performed by one of a CU, a DU 165, or an RU 170, while other functions of the protocol layer are performed by a different one of the CU, the DU 165, or the RU 170). A DU 165 may be connected to one or more RUs 170 via a fronthaul communication link 168 (e.g., open fronthaul (FH) interface). In some examples, a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a service-based network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for capability indication to multiple services in a service-based wireless system as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs, RUs 170, RIC, SMO).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical (PHY) layer structure for supporting the communication links 125. For example, a carrier used for a communication link 125 may include a portion of a RF spectrum band (e.g., a bandwidth part (BWP)) that is operated according to one or more PHY layer channels for a given radio access technology (e.g., 4G, 5G, 6G radio access technology). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IOT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

In some deployments, multiple RANs may be accessed by one or more UEs 115 or network entities 105 such as, for example, a 6G RAT and a 5G RAT. In some examples, the 6G RAT may be associated with service-based network 130 and the 5G RAT may be associated with a 5G Core 190. The 5G core 190 may provide user authentication, access authorization, tracking, Internet Protocol (IP) connectivity, and other access, routing, or mobility functions. The 5G core 190 may be an evolved packet core (EPC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the 5G core 190. User IP packets may be transferred through the user plane entity, which may provide IP address allocation as well as other functions. The user plane entity may be connected to IP services 195 for one or more network operators. The IP services 195 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may include a packet-based network that operates using a cloud platform, such as service platform 150, that provides CN/RAN services 185. The CN/RAN services 185, in some examples, may be hosted based on a deployment topology and capabilities for service parameters associated with each service. Providing CN/RAN services 185 allows for separation of particular services (e.g., mobility, connection state management, security, paging, radio access services, quality of service (QOS) configuration and data services, UE capability management, location, messaging, among others) from transport functions (e.g., data radio bearer (DRB) and logical channel (LC) management, data service configuration, among others). Service-based functions (e.g., a message broker decouple radio network procedures from network delivery mechanisms) may allow for flexibility of some functions (e.g., layer 2 (L2) functions) to be hosted anywhere in the cloud, and may enable enhanced scalability, resiliency, elasticity, agility, reuse, visibility, automation, failover, or any combinations thereof (e.g., each service across RAN and core network may scale independently by increasing or decreasing resources allocated across functions independently). Further, efficiency may be enhanced through providing real-time link management to the RAN edge, and allowing for adaptation at the DU 165 for more efficient activation, deactivation, or selection of features based on UE conditions.

In some implementations, the wireless communications system 100 may support signaling and mechanisms that enable DUs associated with a first RAT (e.g., 5G DU) to utilize signaling of the first RAT to facilitate services provided via the service-based network 130 associated with a second RAT (e.g., 6G). In other words, aspects of the present disclosure are directed to techniques that enable 6G communications to be performed over a 5G network in order to facilitate migration to 6G services. For example, a 5G DU 165 of the wireless communications system 100 may include a 5G/6G adaptor component (which may include hardware and/or software) that interfaces with CN/RAN services 185 of the service-based network 130 associated with a second RAT, and translates signaling of the second RAT into signaling of the first RAT, and vice versa. For instance, the 5G/6G adaptor may receive 6G communications from CN/RAN services 185 of the service-based network 130, and configure the DU 165 (via an F1 interface) with a 5G service configuration for relaying the 6G information to a UE 115 via 5G signaling. Conversely, the 5G DU 165 may receive 5G signaling from the UE 115 intended for CN/RAN services 185, and may convey the 5G signaling to the 5G/6G adaptor via the F1 service so that the 5G/6G adaptor can format the signaling into a 6G format for relaying to the applicable CN/RAN services 185.

Techniques described herein may enable DUs 165 associated with a first RAT (e.g., 4G, 5G) to facilitate communications between UEs 115 and CN/RAN services 185 associated with a second RAT (e.g., 6G) of a service-based network 130. In other words, aspects of the present disclosure may enable 5G DUs 165 to utilize 5G signaling to provide UEs 115 access to a 6G service-based network 130. Accordingly, aspects described herein may reduce the cost associated with building out a service-based network 130, and may increase the speed with which wireless networks are able to migrate to service-based networks. Moreover, by enabling DUs 165 associated with a first RAT to facilitate communications with a service-based network 130 associated with a second RAT, aspects of the present disclosure may facilitate more widespread access to the service-based network 130 as the infrastructure for the service-base network 130 is built out.

Figure 2:
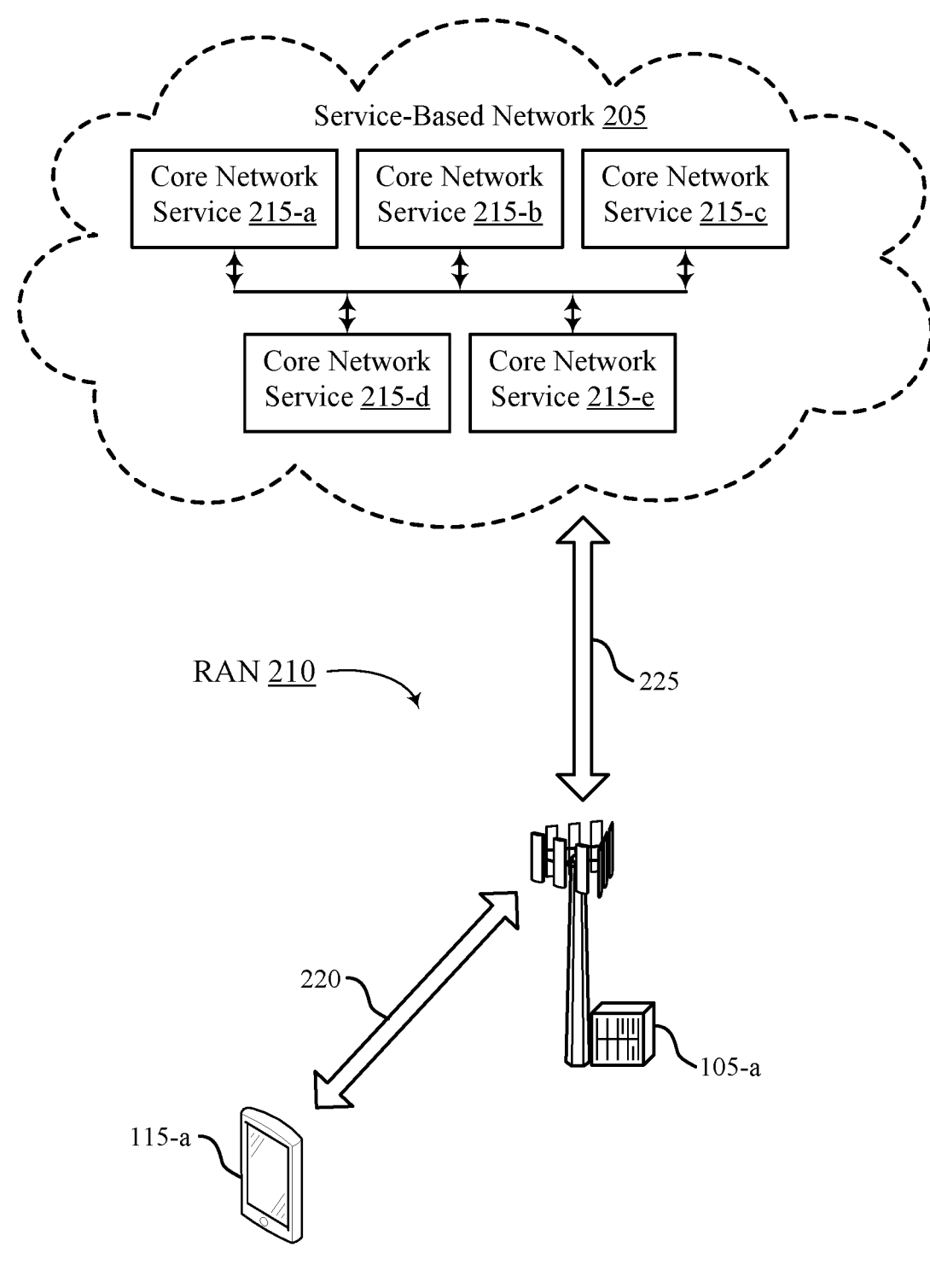
FIG. 2 illustrates an example of a wireless communications system that supports techniques for establishing connectivity to a service-based network via a radio access network (RAN) in accordance with one or more aspects of the present disclosure.

FIG. 2 illustrates an example of a wireless communications system 200 that supports techniques for service establishment in a service-based wireless system in accordance with one or more aspects of the present disclosure. Aspects of the wireless communications system 200 may implement, or be implemented by, aspects of the wireless communications system 100. In some implementations, the wireless communications system 200 illustrates an example architecture of a service-based wireless communications system, such as a 6G network as described with reference to FIG. 1.

The wireless communications system 200 may include one or more UEs 115 (e.g., UE 115-a), one or more network entities (e.g., network entity 105-a), and a service-based network 205. In some aspects, the service-based network 205 may be configured to communicate or interface with a RAN 210 of the wireless communications system 200, where the RAN 210 includes the one or more network entities (e.g., network entity 105-a). The service-based network 205 may support or offer a set of core network services 215 (e.g., core network services 215-a, 215-b, 215-c, 215-d, 215-d, 215-e). In some implementations, the service-based network 205 may include or be associated with a cloud platform, where the respective core network services 215 are hosted at respective network addressees in the cloud platform.

The UE 115-a may communicate with the network entity 105-a using one or more communication links 220, which may include an example of an access link (e.g., a Uu link). The communication link 220 may include a bi-directional link that can include both uplink and downlink communication. Similarly, the network entity 105-a of the RAN 210 may be configured to communicate with (e.g., interface with) the service-based network 205 via one or more communication links (e.g., communication ink 225), where the communication link 215 may be configured to facilitate bi-directional communications between the network entity 105-a and each of the respective core network services 215 of the service-based network 205.

As shown in FIG. 2, the wireless communications system 200 may exhibit a service-based architecture where the entities of the RAN 210 (e.g., network entity 105-a) are configured to connect the UE 115-a to core network services 215 of the service-based network 205. In particular, the RAN 210 (e.g., network entity 105-a) may be configured to relay communications between the UE 115-a and the various core network services 215 of the service-based network to enable the UE 115-a to establish and maintain wireless connections with the respective core network services 215 in order to exchange communications associated with the various network functionalities that are supported by the respective core network services 215. In other words, the wireless communications system 200 may enable the UE 115-a to "subscribe" to the respective core network services 215 on an à la carte basis depending on the needs or requirements of the UE 115-a. In this regard, different UEs 115 within the wireless communications system 200 may be able to subscribe to different subsets of core network services 215 depending on the capabilities of the UEs 115, applications executed at the UEs 115, a mobility of the UEs 115, etc.

Each core network service 215 may be associated with a respective network address within the service-based network 205. Stated differently, each core network service 215 may be hosted at one or more components of a cloud-based network, where the components of each core network service 215 may be associated with a respective network address. The respective core network services 215 may be provided by network providers, third-party entities, etc., where each core network service 215 is configured to support a respective service or functionality offered to the components of the wireless communications system 200 (e.g., UE 115-*a*, network entity 105-*a*).

Different services, functionalities, and core network functions that may be supported or offered by the respective core network services 215 may include, but are not limited to, a mobility service, a security service, a privacy service, a location service, etc. For example, the first core network service 215-*a* may include a core network mobility service that that hosts information and provides signaling that facilitate the geographical movement of the UE 115-*a* throughout wireless communications system. By way of another example, the second core network service 215-*b* may include a security service that provides security and encryption services to subscribing UEs 115 within the wireless communications system 200.

In some aspects, each core network service 215 may include a respective API configured to facilitate wireless communications with the network entity 105-*a* and the UE 115-*a*, such as the network service APIs 180 illustrated in FIG. 1. APIs at the respective core network services 215 may include routing APIs, configuration APIs, or both. Routing APIs may be configured for service data unit communications between the UE 115-*a* and the respective core network services 215. Comparatively, configuration APIs may be configured to facilitate communications between the network entity 105-*a* and the respective core network services 215 to negotiate service requirements and service-specific operation.

In some aspects, the network entity 105-*a* (e.g., eDU) may facilitate traffic routing (e.g., service data unit routing) from the UE 115-*a* to the core network services 215, and vice versa. The network entity 105-*a* may facilitate traffic routing between the respective devices directly, via other network entities 105-*a*, via proxy, or any combination thereof. Moreover, in some cases, the UE 115-*a* may be communicatively coupled to multiple network entities 105 (e.g., dual connectivity), where the multiple network entities 105 facilitate traffic routing with the same or different sets of core network services 215. Additionally, the network entity 105-*a* may support service configurations or service contexts associated with communications parameters within the system, such as QoS flows, security, and UE 115 service contexts. In some aspects, the communication link 220 between the network entity 105-*a* and the UE 115-*a* may be associated with an access stratum configuration that facilitates over-the-air service awareness. The access stratum configuration may include logical channels, access stratum security, access stratum context, and the like. For example, the access stratum configuration may be associated with a service-specific configuration (e.g., logical channels corresponding to QoS flows for each respective core network service 215) and a service-agnostic configuration (e.g., parameters which are common to all core network services 215).

The service-based wireless communications system 200 (e.g., 6G network) illustrated in FIG. 2 may exhibit several differences and advantages as compared to some other types of wireless systems, such as networks that instead exhibit a relatively more vertical, hierarchical architecture that includes many "layers" of different devices that perform functions for the network. A more hierarchical structure may result in processing and other functions being performed at multiple devices (e.g., network entity 105 and one or more back-end devices), thereby leading to inefficient use of resources and high power consumption. Additionally, the back-end architecture of a network with a more vertical, hierarchical architecture may be owned and maintained by a small handful of operators, which may render it difficult for other parties/entities to integrate with such systems, and services offered to UEs 115 and other devices may be difficult to customize within such systems.

Comparatively, service-based wireless communications system 200 illustrated in FIG. 2 exhibits a flatter, horizontal architecture which enables the respective functions of wireless communications systems to be distributed across different components (e.g., core network services 215) of the system. For example, such functions and protocols may be divided up and distributed across the set of core network services 215 such that each core network service 215 may support or enable a small portion of the capabilities and functionality of conventional wireless communications systems. In other words, the service-based architecture may enable functions and protocols to be split into self-contained services (e.g., core network services 215) as compared to components that provide all-encompassing network functions and protocols (e.g., modularization of network services/functionality across multiple core network services 215).

In this regard, the wireless communications system 200 may illustrate an example of a cloud-native platform configured to host a merger of CORE and RAN services, which may simplify protocols and reduce a duplication of processing operations across CORE and RAN (e.g., redistribution of CORE and RAN 210 services). In other words, the convergence of RAN 210 and CN functions may reduce repeated operations and functionality to serve one UE at different layers.

The wireless communications system 200 may extend benefits associated with the service-based architecture of the service-based network 205 to the RAN 210, including benefits of increased scalability, resiliency, elasticity, agility, reuse, visibility, automation, and failover. Additionally, the service-based architecture may enable each core network service 215 across RAN 210 and CORE to scale independently by increasing or decreasing resources allocated across the respective core network services 215 independently.

In some implementations, as will be described in further detail herein, the wireless communications system 200 may support signaling and mechanisms that enables the network entity 105-*a* associated with a first RAT (e.g., 4G, 5G) to facilitate communication between the UE 115-*a* and core network services 215 of the service-based network 205 associated with a second RAT, such as a 6G network.

Figure 3:
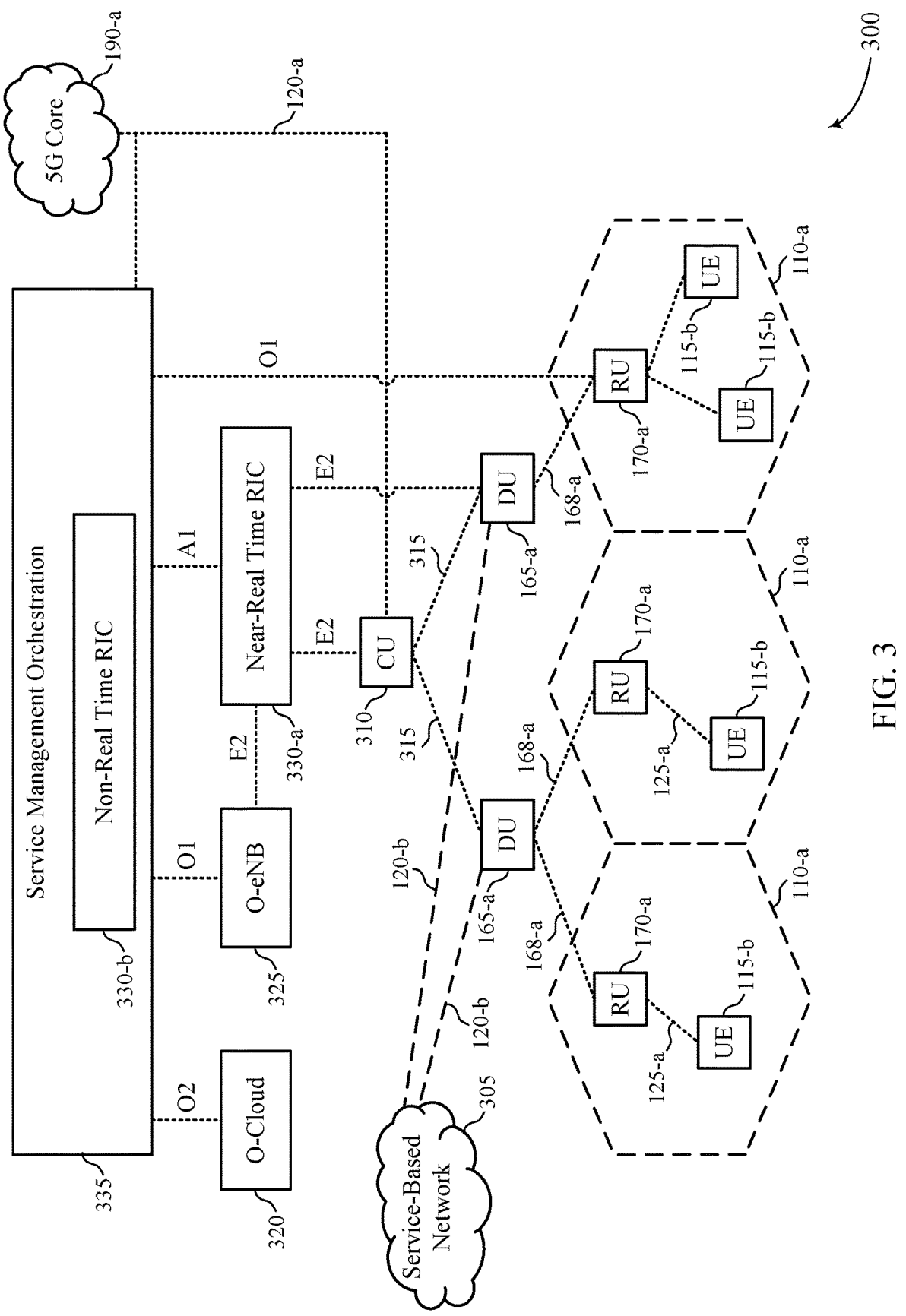
FIG. 3 illustrates an example of a network architecture that supports techniques for establishing connectivity to a service-based network via a RAN in accordance with one or more aspects of the present disclosure.

FIG. 3 illustrates an example of a network architecture 300 (e.g., a disaggregated base station architecture, a disaggregated RAN architecture) that supports techniques for service establishment in a service-based wireless system in accordance with one or more aspects of the present disclosure. The network architecture 300 may illustrate an example for implementing one or more aspects of the wireless communications system 100. The network architecture 300 may include a service-based network 305, which may be an example of a service-based network 130 or 205, that communicates with DUs 165-*a* via links 120-*b*. In this example, DUs 165 may also communicate with one or more CUs 310 that may communicate directly with a 5G core 190-*a* via a backhaul communication link 120-*a*, or indirectly with the 5G core 190-*a* through one or more disaggregated network entities 105 (e.g., a Near-RT RIC 330-*a* via an E2 link, or a Non-RT RIC 330-*b* associated with an SMO 335 (e.g., an SMO Framework), or both). A CU 310 may communicate with one or more DUs 165-*a* via respective midhaul communication links 315 (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*b* via one or more communication links 125-*a*. In some implementations, a UE 115-*b* may be simultaneously served by multiple RUs 170-*a*.

Each of the network entities 105 of the network architecture 300 (e.g., CUs 310, DUs 165-*a*, RUs 170-*a*, Non-RT RICs 330-*a*, Near-RT RICs 330-*b*, SMOs 335, Open Clouds (O-Clouds) 320, Open eNBs (O-eNBs) 325) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 310 may host one or more higher layer control functions. Such control functions may include RRC, PDCP, SDAP, or the like. Each control function may be implemented with an interface configured to communicate signals with other control functions hosted by the CU 310. A CU 310 may be configured to handle user plane functionality (e.g., CU-UP), control plane functionality (e.g., CU-CP), or a combination thereof. In some examples, a CU 310 may be logically split into one or more CU-UP units and one or more CU-CP units. A CU-UP unit may communicate bidirectionally with the CU-CP unit via an interface, such as an E1 interface when implemented in an O-RAN configuration. A CU 310 may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, when interfacing with service-based network 305, a DU 165-*a* may host one or more APIs for one or more services of the service-based network 305 and one or more corresponding services at one or more UEs 115-*b*. In some examples, when interfacing with CUs 310, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 310.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*b*. In some implementations, real-time and non-real-time aspects of control and user plane communication with the RU(s) 170-*a* may be controlled by the corresponding DU 165-*a*. In some examples, such a configuration may enable a DU 165-*a* and a CU 310 to be implemented in a cloud-based RAN architecture, such as a vRAN architecture.

The SMO 335 may be configured to support RAN deployment and provisioning of non-virtualized and virtualized network entities 105. For non-virtualized network entities 105, the SMO 335 may be configured to support the deployment of dedicated physical resources for RAN coverage requirements which may be managed via an operations and maintenance interface (e.g., an O1 interface). For virtualized network entities 105, the SMO 335 may be configured to interact with a cloud computing platform (e.g., an O-Cloud 320) to perform network entity life cycle management (e.g., to instantiate virtualized network entities 105) via a cloud computing platform interface (e.g., an O2 interface). Such virtualized network entities 105 can include, but are not limited to, CUs 310, DUs 165-*a*, RUs 170-*a*, and Near-RT RICs 330-*a*. In some implementations, the SMO 335 may communicate with components configured in accordance with a 4G RAN (e.g., via an O1 interface). Additionally, or alternatively, in some implementations, the SMO 335 may communicate directly with one or more RUs 170-*a* via an O1 interface. The SMO 335 also may include a Non-RT RIC 330-*b* configured to support functionality of the SMO 335.

The Non-RT RIC 330-*b* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 330-*a*. The Non-RT RIC 330-*b* may be coupled to or communicate with (e.g., via an A1 interface) the Near-RT RIC 330-*a*. The Near-RT RIC 330-*a* may be configured to include a logical function that enables near-real-time control and optimization of RAN elements and resources via data collection and actions over an interface (e.g., via an E2 interface) connecting one or more CUs 310, one or more DUs 165-*a*, or both, as well as an O-eNB 325, with the Near-RT RIC 330-*a*.

In some examples, to generate AI/ML models to be deployed in the Near-RT RIC 330-*b*, the Non-RT RIC 330-*b* may receive parameters or external enrichment information from external servers. Such information may be utilized by the Near-RT RIC 330-*a* and may be received at the SMO 335 or the Non-RT RIC 330-*b* from non-network data sources or from network functions. In some examples, the Non-RT RIC 330-*b* or the Near-RT RIC 330-*a* may be configured to tune RAN behavior or performance. For example, the Non-RT RIC 330-*b* may monitor long-term trends and patterns for performance and employ AI or ML models to perform corrective actions through the SMO 335 (e.g., reconfiguration via O1) or via generation of RAN management policies (e.g., A1 policies).

In some implementations, as will be described in further detail herein, the network architecture 300 may support signaling and mechanisms that enables the network entity 105-*a* associated with a first RAT (e.g., 4G, 5G) to facilitate communication between the UE 115-*a* and core network services 215 of the service-based network 205 associated with a second RAT, such as a 6G network.

Figure 4:
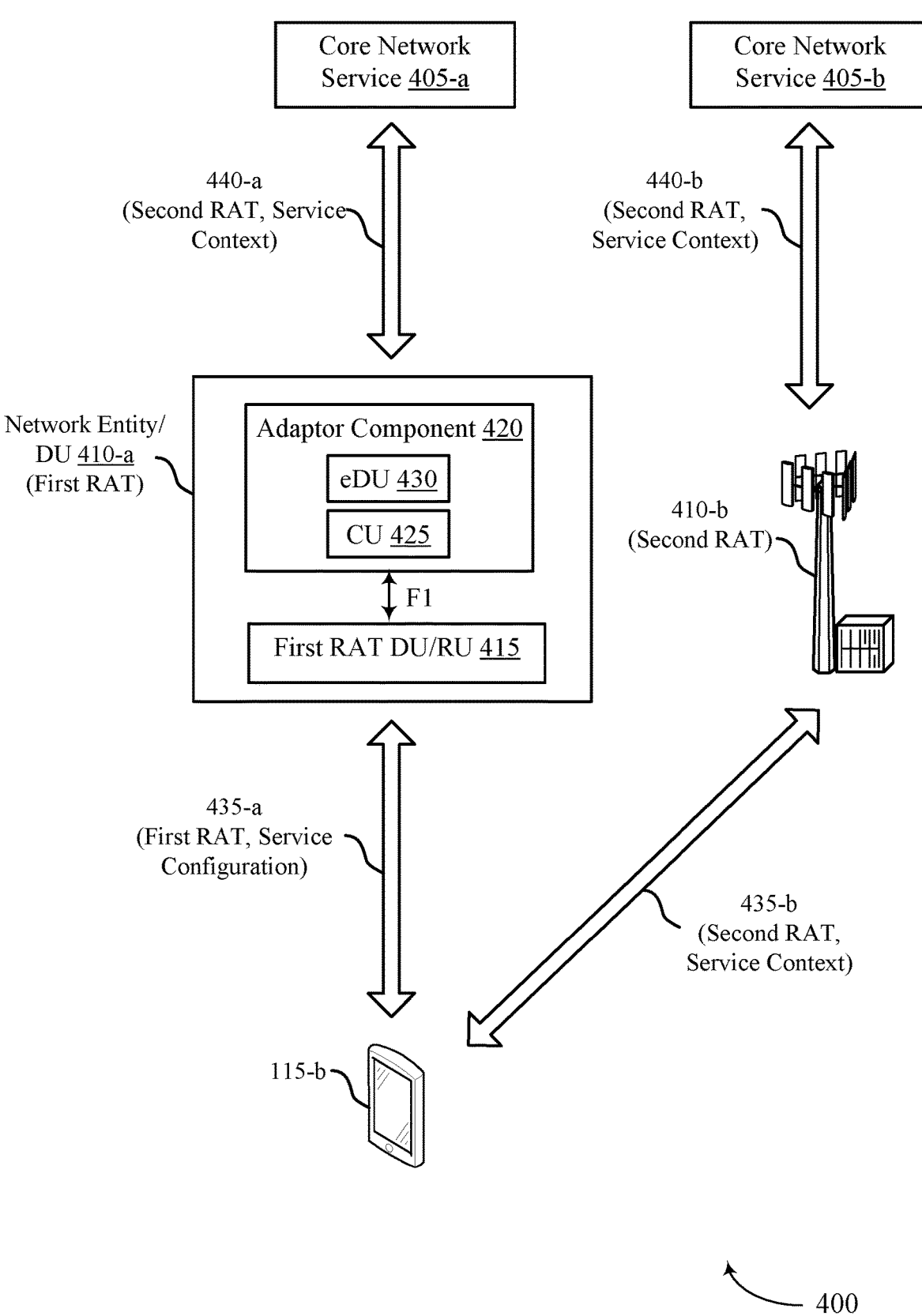
FIG. 4 illustrates an example of a wireless communications system that supports techniques for establishing connectivity to a service-based network via a RAN in accordance with one or more aspects of the present disclosure.

FIG. 4 illustrates an example of a wireless communications system 400 that supports techniques for establishing connectivity to a service-based network via a RAN in accordance with one or more aspects of the present disclosure. In some examples, aspects of the wireless communications system 400 may implement, or be implemented by, aspects of the wireless communications system 100, the wireless communications system 200, the network architecture 300, or any combination thereof. In particular, the wireless communications system 400 may support signaling that enables network entities 105 associated with a first RAT to facilitate communications between UEs 115 and core network services of a service-based network associated with a second RAT, such as a 6G network, as described with respect to FIG. 1.

The wireless communications system 400 may include a UE 115-*b*, a first network entity 410-*a* (e.g., first DU), a first core network service 405-*a*, a second network entity 410-*b* (e.g., second DU), and a second core network service 405-*b*. In some implementations, the network entities 410-*a*, 410-*b* may include examples of O-RAN entities which include multiple components, such as one or more DUs, as shown and described in FIG. 3. In this regard, the network entities 410-*a*, 410-*b* illustrated in FIG. 4 may additionally or alternatively be referred to as a DU or eDU, as will be further shown and described herein.

The core network services 405-*a*, 405-*b* may be associated with a service-based network, such as the service-based network 205 illustrated in FIG. 2. In some aspects, the service-based network including the core network services 405 may be configured to communicate or interface with a RAN of the wireless communications system 400, where the RAN includes the one or more network entities (e.g., network entities 410). In some implementations, the core network services 405 may be associated with, or hosted by, a cloud platform, where the respective core network services 405 are hosted at respective network addressees or destinations in the cloud platform. In this regard, communications (e.g., service messages) may include network addresses, service IDs, or other information which indicate the respective core network services 405 as the respective destination of the communications within the service-based network.

In some aspects, the first network entity 410-*a* may be associated with a first RAT, such as an LTE, 4G, or 5G RAT, and the second network entity 410-*b* may be associated with a second RAT, such as a 6G or other service-based RAT. In this regard, the UE 115-*b* may communicate with the first network entity 410-*a* using a communication link 435-*a*, which may be an example of an NR or LTE link between the UE 115-*b* and the first network entity 410-*a*. Similarly, the UE 115-*b* may communicate with the second network entity 410-*b* using a communication link 435-*b*, which may be an example of a 6G link between the UE 115-*b* and the second network entity 410-*b*. In some cases, the communication links 435-*a*, 435-*b* may include examples of access links (e.g., Uu links) which may include bi-directional links that enable both uplink and downlink communication between the UE 115-*b* and the respective network entities 410.

The respective network entities 410 may be configured access or communicate with (e.g., interface with) the core network services 405 of the service-based network via communication links 440-*a* and 440-*b*, where the communication links 440 may be configured to facilitate bi-directional communications between the network entities 410 and the respective core network services 405. In some aspects, each core network service 405 may include a respective API configured to facilitate wireless communications with the respective network entities 410 and the UE 115-*b*, such as the network service APIs 180 illustrated in FIG. 1. While the core network services 405-*a*, 405-*b* are illustrated as separate entities in FIG. 4, this is solely for illustrative purposes. For example, the first core network service 405-*a* and the second core network service 405-*b* may include the same core network service 405 in some cases. In this regard, in some cases, the first network entity 410-*a* and the second network entity 410-*b* may be communicatively coupled to the same and/or different core network services 405.

In some aspects, the network entities 410 may facilitate traffic routing (e.g., service data unit routing) from the UE 115-*b* to the core network services 405, and vice versa. In other words, the network entities 410 may be configured to relay communications (e.g., service messages) from the UE 115-*b* to the core network services 405, and vice versa. The network entities 410 may facilitate traffic routing between the respective devices directly, via other network entities 410, via proxy, or any combination thereof.

In some aspects, the wireless communications system 400 may support multiple deployment scenarios, including 5G and 6G standalone radio options (with 5GC or 6GC acting as the core network), as well as dual-connectivity operations. Moreover, as will be described in further detail herein, the wireless communications system 400 may support additional deployment scenarios in which various operations and functions are split between RATs. For example, in accordance with a first implementation, the UE 115-*b* may be configured to communicate with the first network entity 410-*a* using NG-RAN (e.g., 5G DU/RU 451) and 6GC core network, where the 5G RAN (e.g., DU/RU 415) interacts with a cloud native 6GC core network via a 6GC proxy service. In accordance with a second implementation, the UE 115-*b* may be configured to communicate with a network entity 410 (not shown) using 6G-RAN (e.g., 6G DU/RU) and 5G-CU' (e.g., upgraded CU).

As noted previously herein, communication with core network services 405 offered by a service-based network (e.g., 6G or cloud-based network) may require more different protocols and communications, which may not be supported by some network entities 410 associated with other RATs, such as 5G DUs. For example, in some cases, the first network entity 410-*a* associated with the first RAT (e.g., 5G network entity 410-*a*) may be unable to perform 6G communications on its own (e.g., without specialized 6G hardware/software). As such, even in cases where the UE 115-*b* is otherwise capable of communicating with the core network services 405, the UE 115-*b* may nonetheless be unable to communicate with the core network services 405 in cases where the UE 115-*b* is unable to access network entities 410 that are configured to interface with the service-based network. Such shortcomings may slow the migration from current RATs to service-based RATs. Moreover, the manufacture and deployment of network entities 410 (e.g., eDUs) that support core network services 405 of a service-based network may require extensive time and investment, which may significantly slow the migration from current RATs to service-based RATs (e.g., migration from 5G to 6G).

Accordingly, the wireless communications system 400 may support signaling and mechanisms that enable network entities 410 (e.g., first network entity 410-*a*, DUs) associated with a first RAT, such as a 5G RAT, to utilize signaling of the first RAT to facilitate communications with core network services 405 provided via a second RAT, such as a 6G RAT. In other words, aspects of the present disclosure are directed to techniques that enable 6G communications to be performed over a 5G network in order to facilitate migration to 6G services.

In this regard, aspects of the present disclosure may support standalone 6G operations and 5G/6G non-stand-alone operations based on dual connectivity and network evolution. Moreover, aspects of the present disclosure may support infrastructure migration to service-based networks by enabling use (e.g., re-use) of a cloud platform and fronthaul interfaces for enabling co-located 5G and 6G operations. Further, aspects of the present disclosure may support spectrum migration by utilizing 5G spectrum bands to facilitate 6G communications on existing deployed frequency bands.

In particular, in some implementations, the first network entity 410-*a* (e.g., 5G DU) may include an adaptor component 420, which may sometimes be referred to as a "5G/6G adaptor." The adaptor component 420 may be configured to interface with the service-based network including the core network services 405, and translate communications between the first RAT (e.g., 5G, NR) and the second RAT (e.g., 6G). In this regard, the adaptor component 420 may be configured to act or serve as a DU (e.g., cDU 430) towards the service-based network, and may therefore be configured to utilize 6G service contexts and routing APIs associated with the second RAT (e.g., 6G). Moreover, the adaptor component 420 may be configured to act or serve as a CU 425 towards a DU/RU 415 associated with the first RAT (e.g., 5G, NR) via the F1 interface (e.g., F1-U/C). In some cases, a capability exposure API of the adaptor component 420 may be configured to exchange capability information with the DU/RU 415.

The adaptor component 420 may include hardware components, software components, or both, and may be added to the first network entity 410-*a* to enable the first network entity 410-*a* to facilitate communications between the UE 115-*b* and the service-based network. For example, the adaptor component of the first network entity 410-*a* may relay or forward the service request to the destination (e.g., network address) associated with the first core network service 405-*a* via the second RAT (e.g., 6G). In this regard, the adaptor component 420 may be configured to expose RAN services towards the rest of the service-based network, and vice versa.

In some aspects, the UE 115-*b* may transmit capability signaling to the first network entity 410-*a*, the second network entity 410-*b*, or both, where the capability signaling indicates a capability of the UE 115-*b* to communicate with core network services 405 offered by a service-based network associated with a second RAT, such as a 6G RAT.

In some aspects, the first network entity 410-*a* (e.g., 5G DU), the second network entity 410-*b* (e.g., 6G DU), or both, may transmit control information indicating one or more core network services 405 offered by a service-based network which are accessible by the respective network entities 410. In this regard, the network (e.g., RAN including network entities 410-*a*, 410-*b*) may be configured to broadcast availability of the 6G network and associated core network services 405.

In some cases, the control information may be indicated via system information block (SIB) messages. In other words, the network entities 410 may utilize SIB messages to indicate or broadcast discovery information associated with 6G core network services 405. The network entities 410 may transmit the control information (e.g., SIBs) indicating supported core network services 405 based on receiving the capability information indicating the UE 115-*b* is able to communicate with the core network services 405. Moreover, in some cases, the UE 115-*b* may be able to query or request information associated with available core network services 405.

For instance, the first network entity 410-*a* may transmit a first SIB (e.g., via the first RAT) indicating that the first network entity 410-*a* is able to facilitate communications with the first core network service 405-*a*, and the second network entity 410-*b* may transmit a second SIB (e.g., via the second RAT) indicating that the second network entity 410-*b* is able to facilitate communications with the second core network service 405-*b*. As noted previously herein, the core network services 405 may be offered by a service-based network (e.g., cloud-based network) associated with a second RAT (e.g., 6G) that is configured to interface with a RAN including the respective network entities 410/DUs.

In some cases, the respective network entities 410 and/or core network services 405 (via APIs) may be able to determine capabilities of the UE 115-*c* and/or the network to support the respective core network services 405, and may therefore be able to determine what capabilities are available. As such, in some cases, the network entities 410 and/or core network services 405 may be configured to enable/disable certain functionality and/or core network services 405 associated with the second RAT based on determined capabilities. For example, the first network entity 410-*a* and/or the first core network service 405-*a* may determine that certain 6G functionality is not available to the UE 115-*b* due to the capabilities of the UE 115-*b*, the capabilities of the first network entity 410-*a*, or both. As such, the control information indicating the available services and/or available functionality of the first core network service 405-*a* may be tailored based on services/functionality that is determined to be supported by the respective devices. As noted previously herein, the first core network service 405-*a* and the second core network service 405-*b* may be the same or different core network services 405.

In some aspects, the UE 115-*b* may transmit, to the first network entity 410-*a* via the first RAT (e.g., 5G), a service request indicating the first core network service 405-*a* offered by (e.g., accessible by) the first network entity 410-*a*. For example, the UE 115-*b* may utilize 5G signaling to request that the first network entity 410-*a* facilitate communications between the UE 115-*b* and the first core network service 405-*a* associated with the 6G network. In this regard, the UE 115-*b* may determine to connect to the service-based network (e.g., 6G network) via a previous generation (e.g., 5G) RAN node (DU 415) based on discovering that the core network services 405 are available via the first network entity 410-*a*/DU 415 (e.g., based on DU 415 broadcasting available core network services 405 via a SIB).

In some aspects, the UE 115-*b* may transmit the service request (e.g., connection request message) to the DU/RU 415 of the first network entity 410-*a* via one or more communication layers associated with the first RAT (e.g., 5G RAT), such as a PHY layer, a MAC layer, an RLC layer, or any combination thereof. In this regard, the service request may be communicated via 5G link layers (e.g., PHY, MAC, RLC), where the service request indicates a connection request for 6G services. Moreover, when transmitting messages intended for core network services 405 (e.g., service request), the UE 115-*b* may utilize communication protocols associated with the second RAT (e.g., 6G protocols) above the PHY/MAC/RLC layers. In this regard, in some cases, the UE 115-*b* may be configured to communicate with the first network entity 410-*a* in a standalone NR state using Layer 1 (L1) and Layer 2 (L2) signaling with a 6GC core network. Based on the UE 115-*b* indicating that the signaling (e.g., service request) is intended for the core network service 405-*a*, and based on configuration, the network entity 410-*a* may be configured to select the CU 425 associated with the adaptor component 420 during CU selection.

In some aspects, the service request may include a network address or other destination identifier associated with the first core network service 405-*a* so that the first network entity 410-*a* (e.g., adaptor component 420, eDU 430) is able to forward or otherwise route the service request to the first core network service 405-*a*. In some aspects, the communications (e.g., service request) exchanged between the first network entity 410-*a* and the first core network service 405-*a* may be communicated in accordance with API information exchanged between the respective devices.

In some aspects, the first network entity 410-*a* may receive a service configuration request from the first core network service 405-*a*. In some aspects, the service configuration request may include a request for the first network entity 410-*a* to convert a service context associated with the second RAT (e.g., 6G service context) to a service configuration associated with the first RAT (e.g., 5G service configuration). In some cases, the service request message may indicate the service context associated with communications between the first network entity 410-*a* and the first core network service 405-*a*. In this regard, the first core network service 405-*a* may take into account that the UE 115-*b* is camping on a 5G cell (e.g., first network entity 410-*a*) for service configuration, and may transmit the service configuration request based on determining that the UE 115-*b* is communicating via the first network entity 410-*a* associated with the first RAT.

In other words, the first core network service 405-*a* may request that the first network entity 410-*a* convert signaling from the first core network service 405-*a* which is intended for the UE 115-*a* and RAN configuration affecting the first network entity 410-*a* into a 5G service configuration and F1 signaling so that the 6G communications from the first core network service 405-*a* may be relayed to the UE 115-*b* via 5G signaling. Stated differently, the first core network service 405-*a* may request for the first network entity 410-*a* to forward 6G signaling from the first core network service 405-*a* to the UE 115-*b* via the F1 interface, and to forward signaling from the UE 115-*b* intended for the 6G core network service 405-*a* (received from DU via the F1 interface) to the first core network service 405-*a* based on the signaling provided by UE 115-*b* and intended for the service-based network The first network entity 410-*a* may determine a service configuration for communicating with the UE 115-*b* via the first RAT (e.g., 5G). In some aspects, the first network entity 410-*a* may determine the service configuration based on the service context associated with the second RAT (e.g., 6G) of the first core network service 405-*a*. Stated differently, the first network entity 410-*a* may determine a 5G service configuration for using 5G signaling with the UE 115-*b* to facilitate communications between the UE 115-*b* and the 6G service-based network. In this regard, the first network entity 410-*a* may determine the service configuration based on receiving the service configuration request from the first core network service 405-*a*.

In some aspects, the UE 115-*b* may receive, from the first network entity 410-*a*, control signaling indicating the service configuration for communicating with the first core network service 405-*a* via the first network entity 410-*a*. In other words, the first network entity 410-*a* may configure the UE 115-*b* with a 5G service configuration for using 5G signaling to communicate with the 6G core network service 405-*a*.

Subsequently, the first network entity 410-*a* may relay one or more service messages between the UE 115-*b* and the first core network service 405-*a*. In other words, the first network entity 410-*a* may receive service messages from the UE 115-*b* and relay the service messages to the first core network service 405-*a*, or vice versa. Moreover, the UE 115-*b* may continue all signaling and data transmission/reception associated with the second RAT (e.g., 6G signaling, including 6G service discovery, configuration, service activation/deactivation, data transmission/reception, etc.) towards the adaptor component 420 through the DU/RU 415 using the 5G link layer protocol stack.

For example, the UE 115-*b* may transmit a first service message to the first network entity 410-*a* via the first RAT (e.g., 5G) and in accordance with the service configuration, where the service message includes the destination (e.g., network address) and a payload of the first core network service 405-*a*. The UE 115-*b* may transmit the first service message via one or more communication layers associated with the first RAT (e.g., 5G RAT), such as a PHY layer, a MAC layer, an RLC layer, or any combination thereof. In this example, the payload of the first service message may be in a format associated with the second RAT (e.g., 6G) so that the first network entity 410-*a* (e.g., adaptor component 420) may relay or forward the first service message to the destination of the first core network service 405-*a* using the second RAT and in accordance with the service context for communications between the first network entity 410-*a* and the first core network service 405-*a*. In this regard, the first network entity 410-*a* may receive 6G service messages from the UE 115-*a* via 5G signaling, and may relay the 6G service messages to the core network service 405-*a* via 6G signaling.

By way of another example, the first core network service 405-*a* may transmit a second service message to the first network entity 410-*a* via the second RAT (e.g., 6G) and in accordance with the service context associated with the second RAT. In this example, the payload of the second service message may be in a format associated with the second RAT (e.g., 6G) so that the first network entity 410-*a* (e.g., adaptor component 420) may relay or forward the second service message to the UE 115-*b* using the first RAT and in accordance with the service configuration associated with the first RAT (e.g., convert the 6G signaling into 5G signaling over F1 interface). In this regard, the first network entity 410-*a* may relay 6G service messages received from the first core network service 405-*a* via 5G signaling.

In some cases, the UE 115-*b* may be configured to operate in a dual-connectivity or non-standalone operational mode or state including connections associated with both the first RAT (e.g., 5G, NR) and the second RAT (e.g., 6G). In some aspects, dual connectivity at the UE 115-*b* may be handled or managed by a dual connectivity core network service 405. For instance, a dual connectivity service (e.g., core network service 405) may control and manage a configuration for dual connectivity at the UE 115-b, where a same data service may be configured to send and receive data to/from the UE 115-b using both RATs (e.g., both the first and second RATs).

For example, in some cases, the UE 115-b may establish a wireless connection with the second network entity 410-b (e.g., second DU) associated with the second RAT. The UE 115-b may establish the connection with the second network entity 410-b based on operating in a dual connectivity state. As noted previously herein, the second network entity 410-b may be communicatively couplable to at least the second core network service 405-b offered by the service-based network. As such, the UE 115-b may establish the connection with the second network entity 410-b based on receiving the control information indicating core network services 405 supported by the second network entity 410-b. The UE 115-b may be configured to establish dual connectivity with the second network entity 410-b by transmitting a service request that requests service with the second core network service 405-b, as described herein.

In some aspects, the UE 115-b may receive control signaling from the second network entity 410-b, where the control signaling indicates a service context usable for communicating with the second core network service 405-b via the second RAT. In this regard, as compared to the service configuration associated with the first RAT (e.g., 5G, NR) and the first network entity 410-a, the second network entity 410-b may indicate a service context associated with the second RAT (e.g., 6G) such that the UE 115-b may utilize signaling associated with the second RAT (e.g., 6G signaling and protocols) to communicate with the second network entity 410-b and the second core network service 405-b.

Subsequently, the second network entity 410-b may relay one or more service messages between the UE 115-b and the second core network service 405-b. In other words, the second network entity 410-b may receive service messages from the UE 115-b and relay the service messages to the second core network service 405-b, or vice versa.

For example, the UE 115-b may transmit a third service message to the second network entity 410-b via the second RAT (e.g., 6G) and in accordance with the service context, where the third service message includes the destination (e.g., network address) and a payload of the second core network service 405-b. In this example, the payload of the third service message may be in a format associated with the second RAT (e.g., 6G) so that the second network entity 410-b may relay or forward the third service message to the destination of the second core network service 405-b using the second RAT and in accordance with the service context.

By way of another example, the second core network service 405-b may transmit a fourth service message to the second network entity 410-b via the second RAT (e.g., 6G) and in accordance with the service context associated with the second RAT. In this example, the payload of the second service message may be in a format associated with the second RAT (e.g., 6G) so that the second network entity 410-b may relay or forward the fourth service message to the UE 115-b using the second RAT and in accordance with the service context.

Techniques described herein may enable DUs (e.g., first network entity 410-a) associated with a first RAT (e.g., 4G, 5G) to facilitate communications between the UE 115-b and core network services 405 associated with a second RAT (e.g., 6G) of a service-based network. In other words, aspects of the present disclosure may enable 5G DUs (e.g., first network entity 410-a) to utilize 5G signaling to provide UEs 115 access to a 6G service-based network. Accordingly, aspects described herein may reduce the cost associated with building out a service-based network, and may increase the speed with which wireless networks are able to migrate to service-based networks. Moreover, by enabling DUs associated with a first RAT to facilitate communications with a service-based network associated with a second RAT, aspects of the present disclosure may facilitate more widespread access to the service-based network as the infrastructure for the service-base network is built out.

Figure 5:
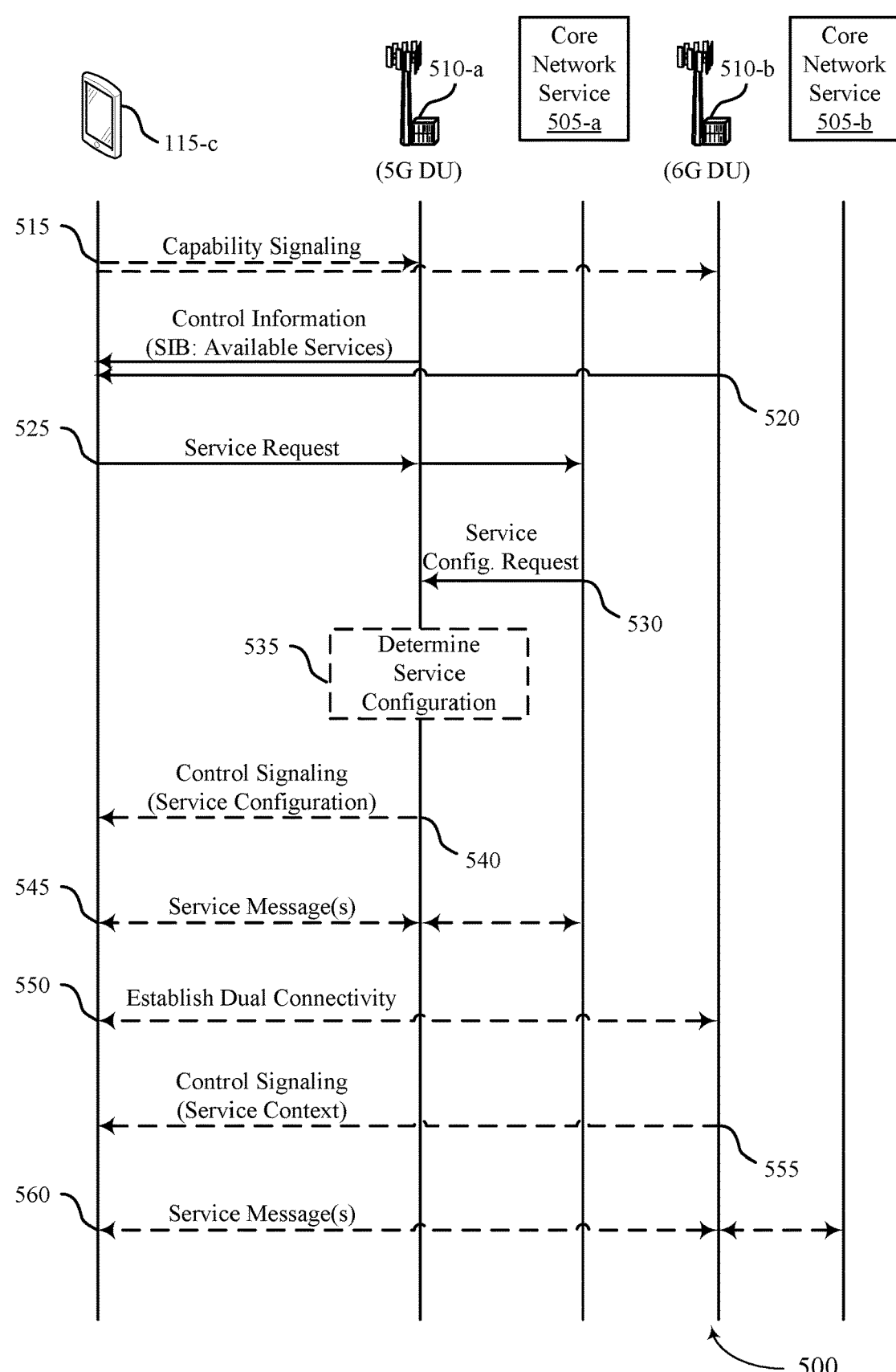
FIG. 5 illustrates an example of a process flow that supports techniques for establishing connectivity to a service-based network via a RAN in accordance with one or more aspects of the present disclosure.

FIG. 5 illustrates an example of a process flow 500 that supports techniques for establishing connectivity to a service-based network via a RAN in accordance with one or more aspects of the present disclosure. In some examples, aspects of the process flow 500 may implement, or be implemented by, aspects of the wireless communications system 100, the wireless communications system 200, the network architecture 300, the wireless communications system 400, or any combination thereof. In particular, the process flow 500 illustrates signaling that enables network entities (e.g., DUs 510) associated with a first RAT to facilitate communications between UEs 115 and core network services 505 of a service-based network associated with a second RAT, such as a 6G network, as described with respect to FIGS. 1-4.

The process flow 500 may include a UE 115-c, a first DU 510-a (e.g., first network entity), a first core network service 505-a, a second DU 510-b (e.g., second network entity), and a second core network service 505-b, which may be examples of UEs 115, network entities 105, core network services, and other wireless devices described with reference to FIGS. 1-4. For example, the first DU 510-a and the second DU 510-b illustrated in FIG. 5 may include examples of the first network entity 410-a and the second network entity 410-b, respectively, as illustrated in FIG. 4. In this regard, the first DU 510-a may be associated with a first RAT (e.g., 5G, NR), and the second DU 510-b may be associated with a second RAT (e.g., 6G).

In some aspects, the core network services 505-a, 505-b may be included within a set of services offered or provided by a service-based network, such as the service-based network 205 illustrated in FIG. 2. In such cases, the service-based network including the core network services 505 may be configured to interface with (e.g., communicate with) a RAN including the respective DUs 510 in order to facilitate communications between the service-based network and the UE 115-c.

In some examples, the operations illustrated in process flow 500 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 515, the UE 115-c may transmit capability signaling to the first DU 510-a, the second DU 510-b, or both, where the capability signaling indicates a capability of the UE 115-c to communicate with core network services 505 offered by a service-based network associated with a second RAT, such as a 6G RAT.

At 520, the first DU 510-a (e.g., 5G DU 510-a), the second DU 510-b (e.g., 6G DU 510-b), or both, may transmit control information indicating one or more core network services 505 offered by a service-based network which are accessible by the respective DUs 510. In this regard, the network (e.g., RAN including DUs 510-*a*, 510-*b*) may be configured to broadcast availability of the 6G network and associated core network services 505. In some cases, the control information may be indicated via SIB messages transmitted via the first RAT (e.g., 5G). The DUs 510 may transmit the control information (e.g., SIBs) indicating supported core network services 505 based on receiving the capability information at 515 indicating the UE 115-*c* is able to communicate with the core network services 505.

For example, the first DU 510-*a* may transmit a first SIB indicating that the first DU 510-*a* is able to facilitate communications with the first core network service 505-*a*, and the second DU 510-*b* may transmit a second SIB indicating that the second DU 510-*b* is able to facilitate communications with the second core network service 505-*b*. As noted previously herein, the core network services 505 may be offered by a service-based network (e.g., cloud-based network) associated with a second RAT (e.g., 6G) that is configured to interface with a RAN including the respective DUs 510.

At 525, the UE 115-*c* may transmit, to the first DU 510-*a* via the first RAT (e.g., 5G), a service request indicating the first core network service 505-*a* offered by (e.g., accessible by) the first DU 510-*a*. For example, the UE 115-*c* may utilize 5G signaling to request that the first DU 510-*a* facilitate communications between the UE 115-*c* and the first core network service 505-*a* associated with the 6G network. The UE 115-*c* may transmit the service request via one or more communication layers associated with the first RAT (e.g., 5G RAT), such as a PHY layer, a MAC layer, an RLC layer, or any combination thereof. The UE 115-*c* may transmit the service request at 525 based on transmitting the capability signaling at 515, receiving the control information at 520, or both.

In some aspects, the service request may include a network address or other destination identifier associated with the first core network service 505-*a* so that the first DU 510-*a* is able to forward or otherwise route the service request to the first core network service 505-*a*. In some aspects, the communications (e.g., service request) exchanged between the first DU 510-*a* and the first core network service 505-*a* may be communicated in accordance with API information exchanged between the respective devices.

As noted previously herein, in some implementations, the first DU 510-*a* (e.g., 5G DU 510-*a*) may include an adaptor component (e.g., 5G/6G adaptor), such as the adaptor component 420 illustrated in FIG. 4. The adaptor component may be configured to interface with the service-based network including the core network services 505, and translate communications between the first RAT (e.g., 5G, NR) and the second RAT (e.g., 6G). The adaptor component may include hardware components, software components, or both, and may be added to the first DU 510-*a* to enable the first DU 510-*a* to facilitate communications between the UE 115-*c* and the service-based network. For example, the adaptor component of the first DU 510-*a* may relay or forward the service request to the destination (e.g., network address) associated with the first core network service 505-*a* via the second RAT (e.g., 6G).

At 530, the first DU 510-*a* may receive a service configuration request from the first core network service 505-*a*. In some aspects, the service configuration request may include a request for the first DU 510-*a* to convert a service context associated with the second RAT (e.g., 6G service context) to a service configuration associated with the first RAT (e.g., 5G service configuration). In some cases, the request or message at 530 may indicate the service context associated with communications between the first DU 510-*a* and the first core network service 505-*a*.

In other words, the first core network service 505-*a* may request that the first DU 510-*a* convert signaling from the first core network service 505-*a* which is intended for the UE 115-*a* and RAN configuration affecting the first DU 510-*a* into a 5G service configuration and F1 signaling so that the 6G communications from the first core network service 505-*a* may be relayed to the UE 115-*c* via 5G signaling. Stated differently, the first core network service 505-*a* may request for the first DU 510-*a* to forward 6G signaling from the first core network service 505-*a* to the UE 115-*c* via the F1 interface, and to forward signaling from the UE 115-*c* intended for the 6G core network service 505-*a* (received from DU via the F1 interface) to the first core network service 505-*a* based on the signaling provided by UE 115-*c* and intended for the service-based network At 535, the first DU 510-*a* may determine a service configuration for communicating with the UE 115-*c* via the first RAT (e.g., 5G). In some aspects, the first DU 510-*a* may determine the service configuration at 535 based on the service context associated with the second RAT (e.g., 6G) of the first core network service 505-*a*. Stated differently, the first DU 510-*a* may determine a 5G service configuration for using 5G signaling with the UE 115-*c* to facilitate communications between the UE 115-*c* and the 6G service-based network. In this regard, the first DU 510-*a* may determine the service configuration at 535 based on receiving the service configuration request at 530.

At 540, the UE 115-*c* may receive, from the first DU 510-*a*, control signaling indicating the service configuration for communicating with the first core network service 505-*a* via the first DU 510-*a*. In other words, the first DU 510-*a* may configure the UE 115-*c* with a 5G service configuration for using 5G signaling to communicate with the 6G core network service 505-*a*. The UE 115-*c* may receive the control signaling at 540 based on transmitting the capability signaling at 515, receiving the control information at 510, transmitting the service request at 525, or any combination thereof.

At 545, the first DU 510-*a* may relay one or more service messages between the UE 115-*c* and the first core network service 505-*a*. In other words, the first DU 510-*a* may receive service messages from the UE 115-*c* and relay the service messages to the first core network service 505-*a*, or vice versa.

For example, the UE 115-*c* may transmit a first service message to the first DU 510-*a* via the first RAT (e.g., 5G) and in accordance with the service configuration, where the service message includes the destination (e.g., network address) and a payload of the first core network service 505-*a*. The UE 115-*c* may transmit the first service message via one or more communication layers associated with the first RAT (e.g., 5G RAT), such as a PHY layer, a MAC layer, an RLC layer, or any combination thereof. In this example, the payload of the first service message may be in a format associated with the second RAT (e.g., 6G) so that the first DU 510-*a* (e.g., adaptor component) may relay or forward the first service message to the destination of the first core network service 505-*a* using the second RAT and in accordance with the service context for communications between the DU 510-*a* and the first core network service 505-*a*. In this regard, the first DU 510-*a* may receive 6G service messages from the UE 115-*a* via 5G signaling, and may relay the 6G service messages to the core network service 505-*a* via 6G signaling.

By way of another example, the first core network service 505-*a* may transmit a second service message to the first DU 510-*a* via the second RAT (e.g., 6G) and in accordance with the service context associated with the second RAT. In this example, the payload of the second service message may be in a format associated with the second RAT (e.g., 6G) so that the first DU 510-*a* (e.g., adaptor component) may relay or forward the second service message to the UE 115-*c* using the first RAT and in accordance with the service configuration associated with the first RAT (e.g., convert the 6G signaling into 5G signaling over F1 interface). In this regard, the first DU 510-*a* may relay 6G service messages received from the first core network service 505-*a* via 5G signaling.

In some cases, the UE 115-*c* may be configured to operate in a dual-connectivity or non-standalone operational mode or state including connections associated with both the first RAT (e.g., 5G, NR) and the second RAT (e.g., 6G). In such cases, the process flow 500 may proceed to 550.

At 550, the UE 115-*c* may establish a wireless connection with the second DU 510-*b* associated with the second RAT. The UE 115-*c* may establish the connection with the second DU 510-*b* based on operating in a dual connectivity state. As noted previously herein, the second DU 510-*b* may be communicatively couplable to at least the second core network service 505-*b* offered by the service-based network. As such, the UE 115-*c* may establish the connection with the second DU 510-*b* based on receiving the control information from the second DU 510-*b* at 520. The UE 115-*c* may be configured to establish dual connectivity with the second DU 510-*b* by transmitting a service request that requests service with the second core network service 505-*b*, as described herein.

At 555, the UE 115-*c* may receive control signaling indicating a service context usable for communicating with the second core network service 505-*b* via the second RAT. In this regard, as compared to the service configuration associated with the first RAT (e.g., 5G, NR) at 540, the second DU 510-*b* may indicate a service context associated with the second RAT (e.g., 6G) such that the UE 115-*c* may utilize signaling associated with the second RAT to communicate with the second DU 510-*b* and the second core network service 505-*b*.

At 560, the second DU 510-*b* may relay one or more service messages between the UE 115-*c* and the second core network service 505-*b*. In other words, the second DU 510-*b* may receive service messages from the UE 115-*c* and relay the service messages to the second core network service 505-*b*, or vice versa.

For example, the UE 115-*c* may transmit a third service message to the second DU 510-*b* via the second RAT (e.g., 6G) and in accordance with the service context, where the third service message includes the destination (e.g., network address) and a payload of the second core network service 505-*a*. In this example, the payload of the third service message may be in a format associated with the second RAT (e.g., 6G) so that the second DU 510-*b* may relay or forward the third service message to the destination of the second core network service 505-*b* using the second RAT and in accordance with the service context.

By way of another example, the second core network service 505-*b* may transmit a fourth service message to the second DU 510-*b* via the second RAT (e.g., 6G) and in accordance with the service context associated with the second RAT. In this example, the payload of the second service message may be in a format associated with the second RAT (e.g., 6G) so that the second DU 510-*b* may relay or forward the fourth service message to the UE 115-*c* using the second RAT and in accordance with the service context.

Techniques described herein may enable DUs (e.g., first DU 510-*a*) associated with a first RAT (e.g., 4G, 5G) to facilitate communications between the UE 115-*c* and core network services 505 associated with a second RAT (e.g., 6G) of a service-based network. In other words, aspects of the present disclosure may enable 5G DUs 510 to utilize 5G signaling to provide UEs 115 access to a 6G service-based network. Accordingly, aspects described herein may reduce the cost associated with building out a service-based network, and may increase the speed with which wireless networks are able to migrate to service-based networks. Moreover, by enabling DUs 510 associated with a first RAT to facilitate communications with a service-based network associated with a second RAT, aspects of the present disclosure may facilitate more widespread access to the service-based network as the infrastructure for the service-base network is built out.

Figure 6:
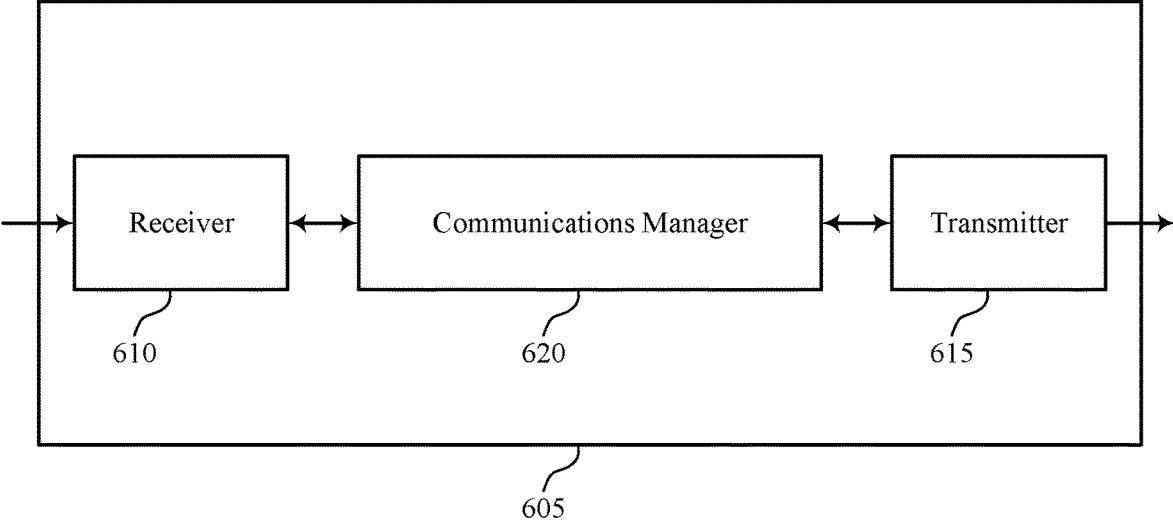
FIGS. 6 and 7 illustrate block diagrams of devices that support techniques for establishing connectivity to a service-based network via a RAN in accordance with one or more aspects of the present disclosure.

FIG. 6 illustrates a block diagram 600 of a device 605 that supports techniques for establishing connectivity to a service-based network via a RAN in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for establishing connectivity to a service-based network via a RAN). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for establishing connectivity to a service-based network via a RAN). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for establishing connectivity to a service-based network via a RAN as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

For example, the communications manager 620 may be configured as or otherwise support a means for receiving, from a DU associated with a first RAT of a RAN, control information indicating a core network service offered by a service-based network associated with a second RAT, the service-based network configured to interface with the RAN. The communications manager 620 may be configured as or otherwise support a means for transmitting, via the first RAT and based on the control information, a service request indicating the core network service offered by the service-based network associated with the second RAT. The communications manager 620 may be configured as or otherwise support a means for receiving, from the DU, control signaling indicating a service configuration for communicating with the core network service offered by the service-based network based on the service request, the service configuration indicating a destination associated with the core network service. The communications manager 620 may be configured as or otherwise support a means for transmitting, to the DU via the first RAT and in accordance with the service configuration, a service message including the destination and payload associated with the core network service, the payload in a format associated with the second RAT.

By including or configuring the communications manager 620 in accordance with examples as described herein, the device 605 (e.g., a processor controlling or otherwise coupled with the receiver 610, the transmitter 615, the communications manager 620, or a combination thereof) may support techniques that enable DUs associated with a first RAT (e.g., 4G, 5G) to facilitate communications between UEs 115 and core network services associated with a second RAT (e.g., 6G) of a service-based network. In other words, aspects of the present disclosure may enable 5G DUs to utilize 5G signaling to provide UEs 115 access to a 6G service-based network. Accordingly, aspects described herein may reduce the cost associated with building out a service-based network, and may increase the speed with which wireless networks are able to migrate to service-based networks. Moreover, by enabling DUs associated with a first RAT to facilitate communications with a service-based network associated with a second RAT, aspects of the present disclosure may facilitate more widespread access to the service-based network as the infrastructure for the service-base network is built out.

Figure 7:
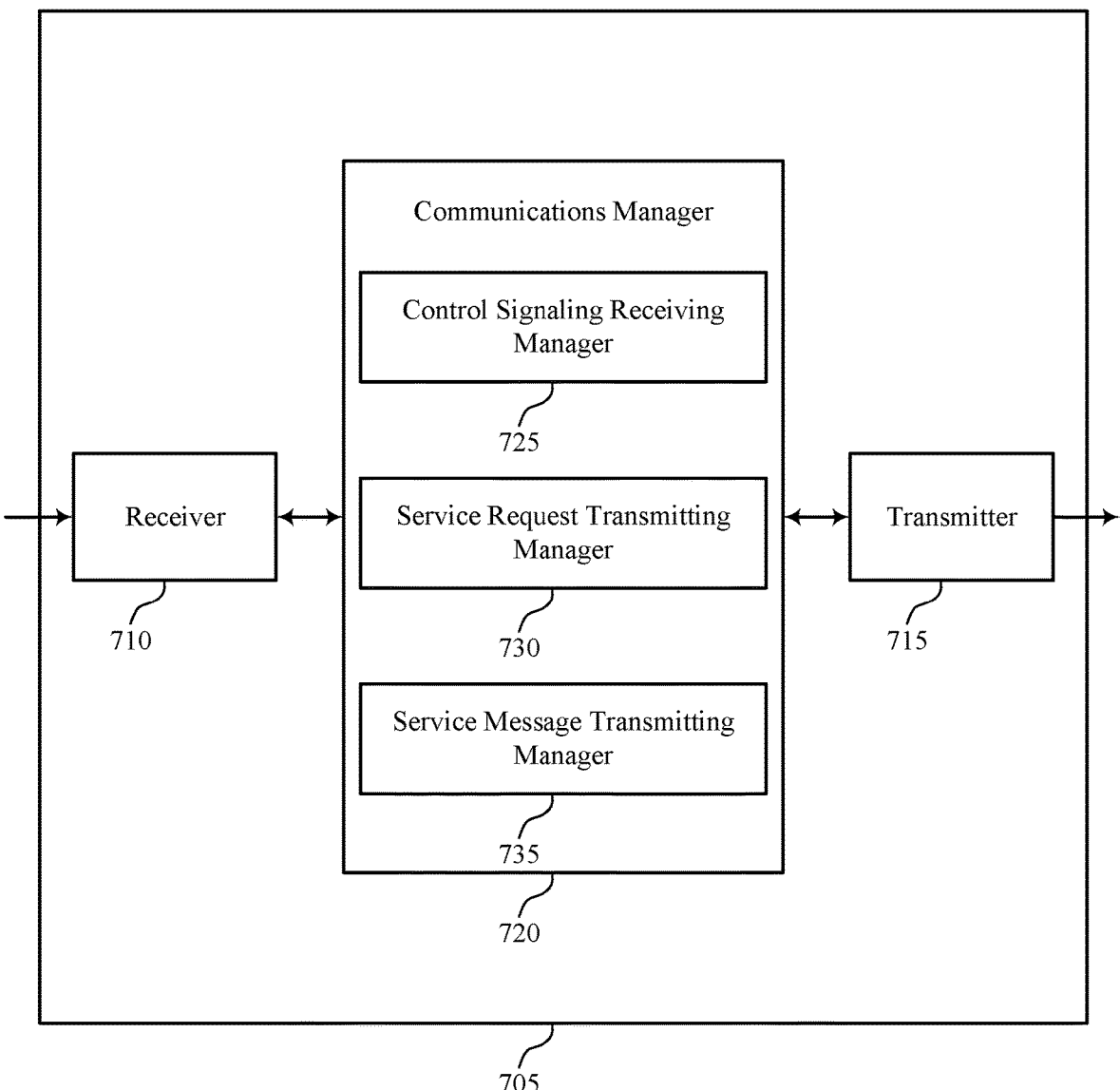

FIG. 7 illustrates a block diagram 700 of a device 705 that supports techniques for establishing connectivity to a service-based network via a RAN in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for establishing connectivity to a service-based network via a RAN). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for establishing connectivity to a service-based network via a RAN). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for establishing connectivity to a service-based network via a RAN as described herein. For example, the communications manager 720 may include a control signaling receiving manager 725, a service request transmitting manager 730, a service message transmitting manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The control signaling receiving manager 725 may be configured as or otherwise support a means for receiving, from a DU associated with a first RAT of a RAN, control information indicating a core network service offered by a service-based network associated with a second RAT, the service-based network configured to interface with the RAN. The service request transmitting manager 730 may be configured as or otherwise support a means for transmitting, via the first RAT and based on the control information, a service request indicating the core network service offered by the service-based network associated with the second RAT. The control signaling receiving manager 725 may be configured as or otherwise support a means for receiving, from the DU, control signaling indicating a service configuration for communicating with the core network service offered by the service-based network based on the service request, the service configuration indicating a destination associated with the core network service. The service message transmitting manager 735 may be configured as or otherwise support a means for transmitting, to the DU via the first RAT and in accordance with the service configuration, a service message including the destination and payload associated with the core network service, the payload in a format associated with the second RAT.

Figure 8:
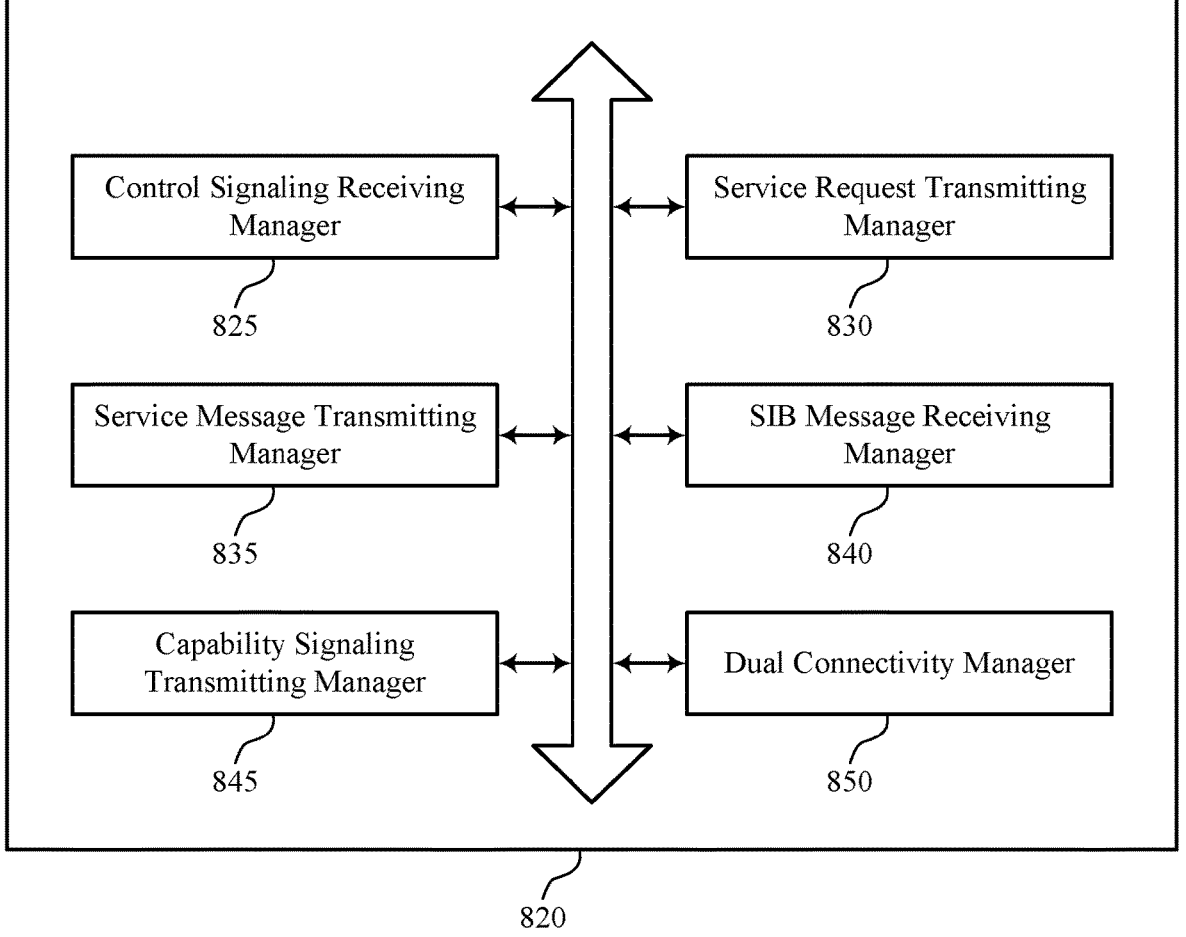
FIG. 8 illustrates a block diagram of a communications manager that supports techniques for establishing connectivity to a service-based network via a RAN in accordance with one or more aspects of the present disclosure.

FIG. 8 illustrates a block diagram 800 of a communications manager 820 that supports techniques for establishing connectivity to a service-based network via a RAN in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for establishing connectivity to a service-based network via a RAN as described herein. For example, the communications manager 820 may include a control signaling receiving manager 825, a service request transmitting manager 830, a service message transmitting manager 835, an SIB message receiving manager 840, a capability signaling transmitting manager 845, a dual connectivity manager 850, or any combination thereof. Each of these components may communicate, directly or indirectly, with one another (e.g., via one or more buses).

The control signaling receiving manager 825 may be configured as or otherwise support a means for receiving, from a DU associated with a first RAT of a RAN, control information indicating a core network service offered by a service-based network associated with a second RAT, the service-based network configured to interface with the RAN. The service request transmitting manager 830 may be configured as or otherwise support a means for transmitting, via the first RAT and based on the control information, a service request indicating the core network service offered by the service-based network associated with the second RAT. In some examples, the control signaling receiving manager 825 may be configured as or otherwise support a means for receiving, from the DU, control signaling indicating a service configuration for communicating with the core network service offered by the service-based network based on the service request, the service configuration indicating a destination associated with the core network service. The service message transmitting manager 835 may be configured as or otherwise support a means for transmitting, to the DU via the first RAT and in accordance with the service configuration, a service message including the destination and payload associated with the core network service, the payload in a format associated with the second RAT.

In some examples, the SIB message receiving manager 840 may be configured as or otherwise support a means for receiving, from the DU, a SIB message including the control information, where the SIB message is received via the first RAT.

In some examples, the capability signaling transmitting manager 845 may be configured as or otherwise support a means for transmitting, to the DU via the first RAT, capability signaling indicating a capability of the UE to communicate with core network services offered by the service-based network associated with the second RAT, where receiving the control information is based on the capability signaling.

In some examples, the dual connectivity manager 850 may be configured as or otherwise support a means for establishing, based on operating in a dual connectivity state, a wireless connection with a second DU associated with the second RAT, where the second DU is communicatively couplable to at least a second core network service offered by the service-based network. In some examples, the service message transmitting manager 835 may be configured as or otherwise support a means for transmitting, to the second DU via the second RAT, a second service message including a second destination associated with the second core network service, the service message further including additional service data associated with the second core network service, the additional service data including an additional payload in the format associated with the second RAT.

In some examples, the control signaling receiving manager 825 may be configured as or otherwise support a means for receiving, from the second DU, second control signaling indicating a service context for communicating with the second core network service via the second RAT, where the second service message is transmitted in accordance with the service context.

In some examples, the service request and the service message are transmitted via one or more communication layers associated with the first RAT, the one or more communication layers including a PHY layer, a MAC layer, an RLC layer, or any combination thereof.

In some examples, the service request, the service message, or both, are transmitted to the DU for relay to the destination associated with the core network service. In some examples, the first RAT includes a 5G RAT, an NR access technology, or both. In some examples, the second RAT includes a 6G RAT.

Figure 9:
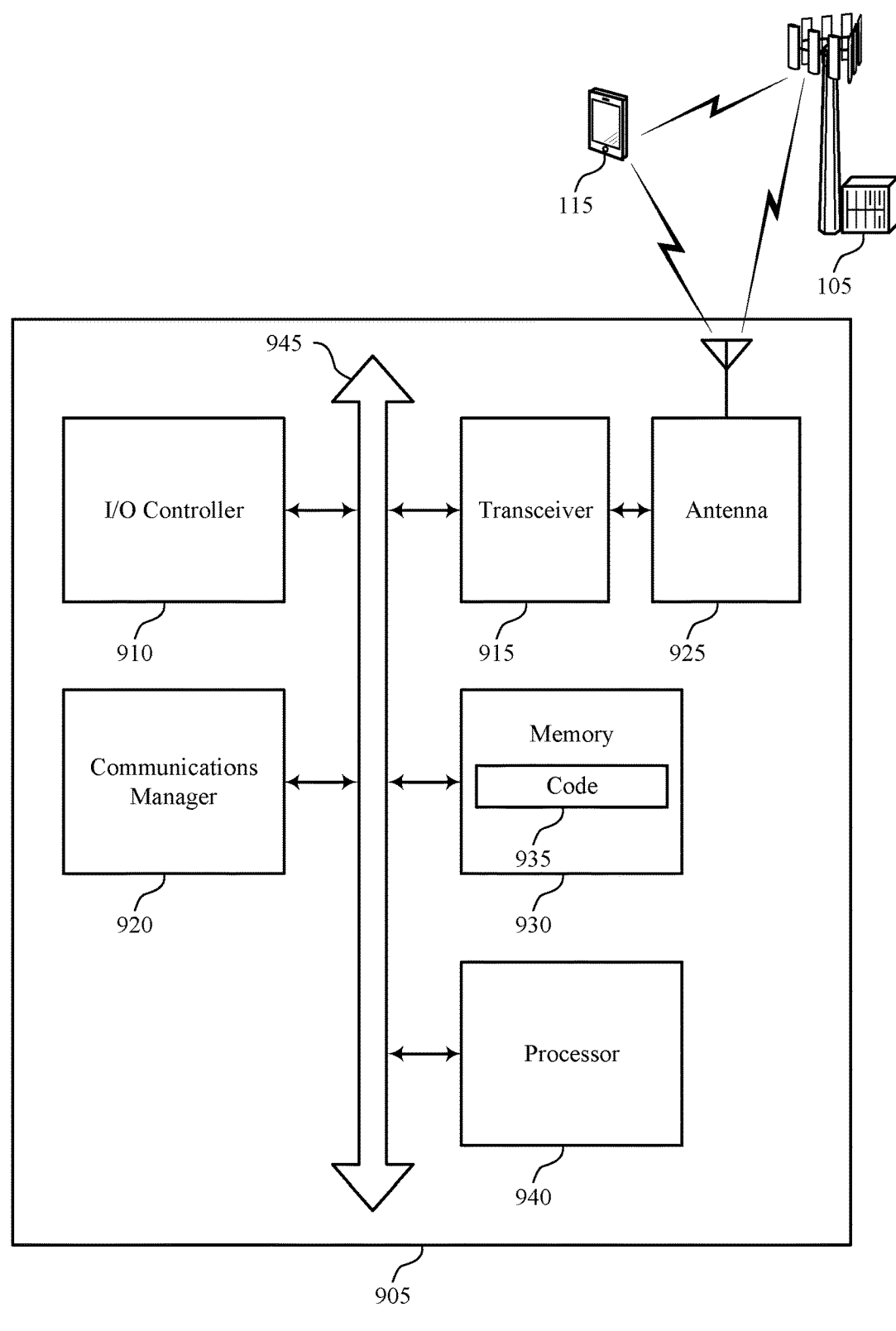
FIG. 9 illustrates a diagram of a system including a device that supports techniques for establishing connectivity to a service-based network via a RAN in accordance with one or more aspects of the present disclosure.

FIG. 9 illustrates a diagram of a system 900 including a device 905 that supports techniques for establishing connectivity to a service-based network via a RAN in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for establishing connectivity to a service-based network via a RAN). For example, the device 905 or a component of the device 905 may include a processor 940 and memory 930 coupled with or to the processor 940, the processor 940 and memory 930 configured to perform various functions described herein.

For example, the communications manager 920 may be configured as or otherwise support a means for receiving, from a DU associated with a first RAT of a RAN, control information indicating a core network service offered by a service-based network associated with a second RAT, the service-based network configured to interface with the RAN. The communications manager 920 may be configured as or otherwise support a means for transmitting, via the first RAT and based on the control information, a service request indicating the core network service offered by the service-based network associated with the second RAT. The communications manager 920 may be configured as or otherwise support a means for receiving, from the DU, control signaling indicating a service configuration for communicating with the core network service offered by the service-based network based on the service request, the service configuration indicating a destination associated with the core network service. The communications manager 920 may be configured as or otherwise support a means for transmitting, to the DU via the first RAT and in accordance with the service configuration, a service message including the destination and payload associated with the core network service, the payload in a format associated with the second RAT.

By including or configuring the communications manager 920 in accordance with examples as described herein, the device 905 may support techniques that enable DUs associated with a first RAT (e.g., 4G, 5G) to facilitate communications between UEs 115 and core network services associated with a second RAT (e.g., 6G) of a service-based network. In other words, aspects of the present disclosure may enable 5G DUs to utilize 5G signaling to provide UEs 115 access to a 6G service-based network. Accordingly, aspects described herein may reduce the cost associated with building out a service-based network, and may increase the speed with which wireless networks are able to migrate to service-based networks. Moreover, by enabling DUs associated with a first RAT to facilitate communications with a service-based network associated with a second RAT, aspects of the present disclosure may facilitate more widespread access to the service-based network as the infrastructure for the service-base network is built out.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for establishing connectivity to a service-based network via a RAN as described herein, or the processor 940 and the memory 930 may be otherwise configured to perform or support such operations.

Figure 10:
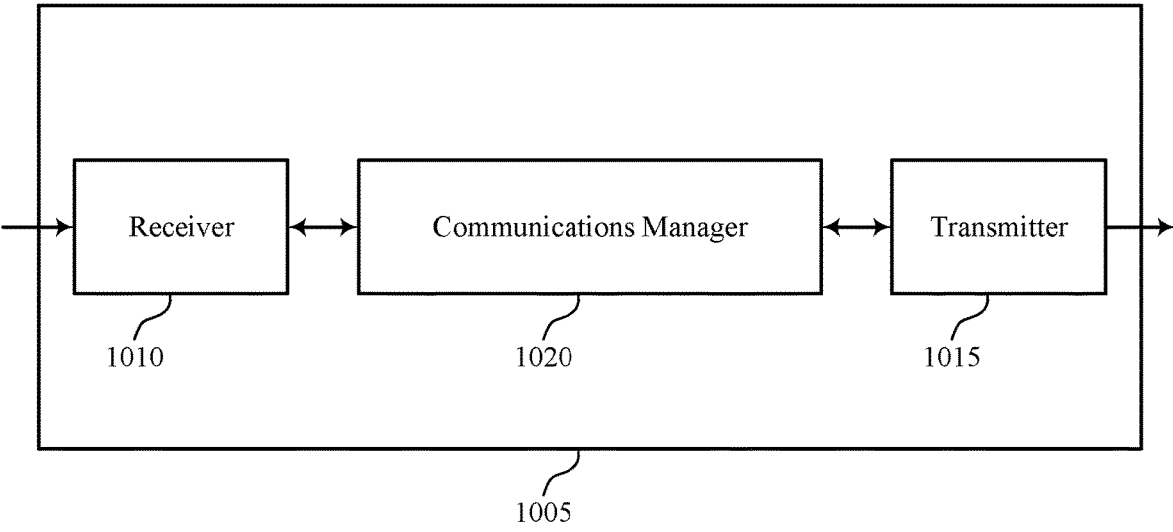
FIGS. 10 and 11 illustrate block diagrams of devices that support techniques for establishing connectivity to a service-based network via a RAN in accordance with one or more aspects of the present disclosure.

FIG. 10 illustrates a block diagram 1000 of a device 1005 that supports techniques for establishing connectivity to a service-based network via a RAN in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for establishing connectivity to a service-based network via a RAN as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

For example, the communications manager 1020 may be configured as or otherwise support a means for receiving a service message from a core network service offered by a service-based network associated with a second RAT, where the service-based network is configured to interface with a RAN associated with the first RAT, the service message indicating a service context associated with the second RAT for communications between the UE and the core network service. The communications manager 1020 may be configured as or otherwise support a means for determining, based on the service context associated with the second RAT, a service configuration for communicating with the UE via the first RAT. The communications manager 1020 may be configured as or otherwise support a means for transmitting the service message to the UE via the first RAT and in accordance with the service configuration, the service message including a payload in a format associated with the second RAT.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques that enable DUs associated with a first RAT (e.g., 4G, 5G) to facilitate communications between UEs 115 and core network services associated with a second RAT (e.g., 6G) of a service-based network. In other words, aspects of the present disclosure may enable 5G DUs to utilize 5G signaling to provide UEs 115 access to a 6G service-based network. Accordingly, aspects described herein may reduce the cost associated with building out a service-based network, and may increase the speed with which wireless networks are able to migrate to service-based networks. Moreover, by enabling DUs associated with a first RAT to facilitate communications with a service-based network associated with a second RAT, aspects of the present disclosure may facilitate more widespread access to the service-based network as the infrastructure for the service-base network is built out.

Figure 11:
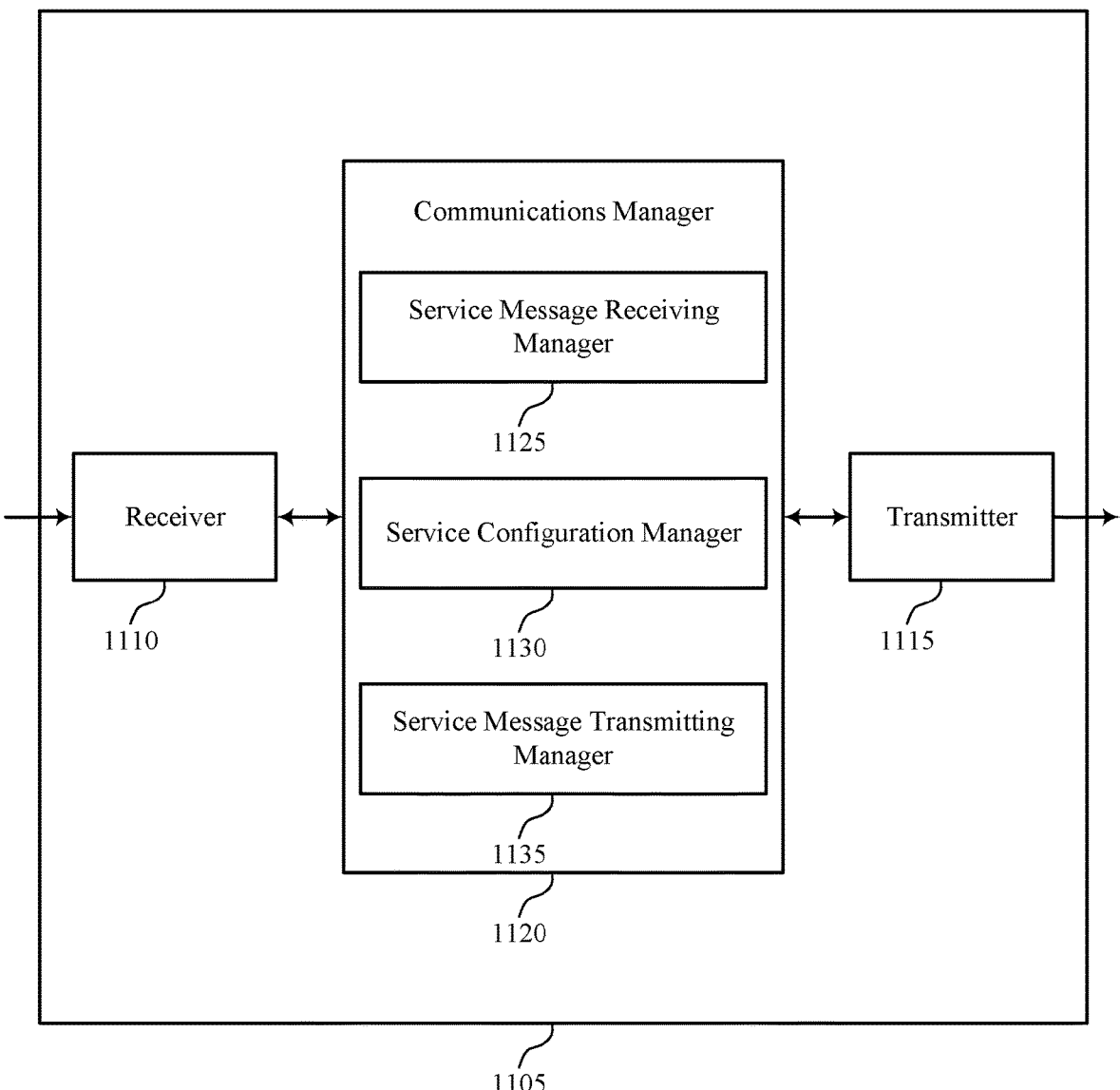

FIG. 11 illustrates a block diagram 1100 of a device 1105 that supports techniques for establishing connectivity to a service-based network via a RAN in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for establishing connectivity to a service-based network via a RAN as described herein. For example, the communications manager 1120 may include a service message receiving manager 1125, a service configuration manager 1130, a service message transmitting manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The service message receiving manager 1125 may be configured as or otherwise support a means for receiving a service message from a core network service offered by a service-based network associated with a second RAT, where the service-based network is configured to interface with a RAN associated with the first RAT, the service message indicating a service context associated with the second RAT for communications between the UE and the core network service. The service configuration manager 1130 may be configured as or otherwise support a means for determining, based on the service context associated with the second RAT, a service configuration for communicating with the UE via the first RAT. The service message transmitting manager 1135 may be configured as or otherwise support a means for transmitting the service message to the UE via the first RAT and in accordance with the service configuration, the service message including a payload in a format associated with the second RAT.

Figure 12:
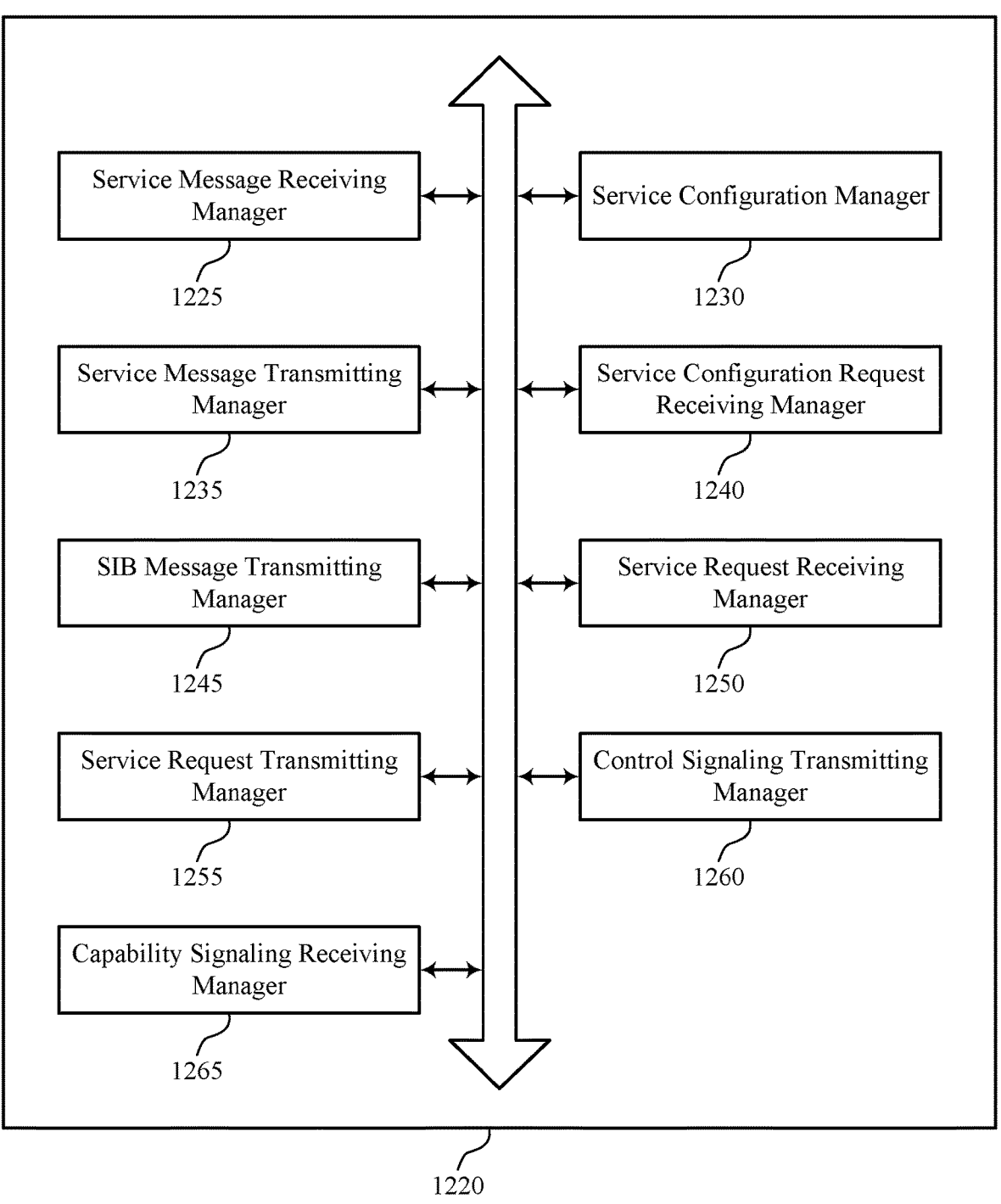
FIG. 12 illustrates a block diagram of a communications manager that supports techniques for establishing connectivity to a service-based network via a RAN in accordance with one or more aspects of the present disclosure.

FIG. 12 illustrates a block diagram 1200 of a communications manager 1220 that supports techniques for establishing connectivity to a service-based network via a RAN in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for establishing connectivity to a service-based network via a RAN as described herein. For example, the communications manager 1220 may include a service message receiving manager 1225, a service configuration manager 1230, a service message transmitting manager 1235, a service configuration request receiving manager 1240, an SIB message transmitting manager 1245, a service request receiving manager 1250, a service request transmitting manager 1255, a control signaling transmitting manager 1260, a capability signaling receiving manager 1265, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The service message receiving manager 1225 may be configured as or otherwise support a means for receiving a service message from a core network service offered by a service-based network associated with a second RAT, where the service-based network is configured to interface with a RAN associated with the first RAT, the service message indicating a service context associated with the second RAT for communications between the UE and the core network service. The service configuration manager 1230 may be configured as or otherwise support a means for determining, based on the service context associated with the second RAT, a service configuration for communicating with the UE via the first RAT. The service message transmitting manager 1235 may be configured as or otherwise support a means for transmitting the service message to the UE via the first RAT and in accordance with the service configuration, the service message including a payload in a format associated with the second RAT.

In some examples, the service configuration request receiving manager 1240 may be configured as or otherwise support a means for receiving, from the core network service via the service message, a service configuration request for converting the service context associated with the second RAT to the service configuration associated with the first RAT, where determining the service configuration and transmitting the service message are based on receiving the service configuration request.

In some examples, the SIB message transmitting manager 1245 may be configured as or otherwise support a means for transmitting, to the UE via the first RAT, a SIB message indicating the core network service offered by the service-based network. In some examples, the service request receiving manager 1250 may be configured as or otherwise support a means for receiving, from the UE via the first RAT and based on the SIB message, a service request indicating the core network service. In some examples, the service request transmitting manager 1255 may be configured as or otherwise support a means for transmitting the service request to a destination associated with the core network service and via the second RAT, where receiving the service message is based on transmitting the service request.

In some examples, the capability signaling receiving manager 1265 may be configured as or otherwise support a means for receiving, from the UE via the first RAT, capability signaling indicating a capability of the UE to communicate with core network services offered by the service-based network associated with the second RAT, where transmitting the SIB message is based on the capability signaling.

In some examples, the service message is received via an adaptor component of the DU. In some examples, the adaptor component is configured to interface with the service-based network and translate communications between the first RAT and the second RAT. In some examples, the adaptor component includes hardware components, software components, or both.

In some examples, the control signaling transmitting manager 1260 may be configured as or otherwise support a means for transmitting, the core network service, control signaling indicating application programming interface information associated with the DU, where the service message is received via the second RAT in accordance with the application programming interface information.

In some examples, the service message is transmitted via one or more communication layers associated with the first RAT, the one or more communication layers including a PHY layer, a MAC layer, an RLC layer, or any combination thereof. In some examples, the first RAT includes a 5G RAT, an NR access technology, or both. In some examples, the second RAT includes a 6G RAT.

Figure 13:
FIG. 13 illustrates a diagram of a system including a device that supports techniques for establishing connectivity to a service-based network via a RAN in accordance with one or more aspects of the present disclosure.

FIG. 13 illustrates a diagram of a system 1300 including a device 1305 that supports techniques for establishing connectivity to a service-based network via a RAN in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for establishing connectivity to a service-based network via a RAN). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

For example, the communications manager 1320 may be configured as or otherwise support a means for receiving a service message from a core network service offered by a service-based network associated with a second RAT, where the service-based network is configured to interface with a RAN associated with the first RAT, the service message indicating a service context associated with the second RAT for communications between the UE and the core network service. The communications manager 1320 may be configured as or otherwise support a means for determining, based on the service context associated with the second RAT, a service configuration for communicating with the UE via the first RAT. The communications manager 1320 may be configured as or otherwise support a means for transmitting the service message to the UE via the first RAT and in accordance with the service configuration, the service message including a payload in a format associated with the second RAT.

By including or configuring the communications manager 1320 in accordance with examples as described herein, the device 1305 may support techniques that enable DUs associated with a first RAT (e.g., 4G, 5G) to facilitate communications between UEs 115 and core network services associated with a second RAT (e.g., 6G) of a service-based network. In other words, aspects of the present disclosure may enable 5G DUs to utilize 5G signaling to provide UEs 115 access to a 6G service-based network. Accordingly, aspects described herein may reduce the cost associated with building out a service-based network, and may increase the speed with which wireless networks are able to migrate to service-based networks. Moreover, by enabling DUs associated with a first RAT to facilitate communications with a service-based network associated with a second RAT, aspects of the present disclosure may facilitate more widespread access to the service-based network as the infrastructure for the service-base network is built out.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for establishing connectivity to a service-based network via a RAN as described herein, or the processor 1335 and the memory 1325 may be otherwise configured to perform or support such operations.

FIG. 14 illustrates a flowchart showing a method 1400 that supports techniques for establishing connectivity to a service-based network via a RAN in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a DU associated with a first RAT of a RAN, control information indicating a core network service offered by a service-based network associated with a second RAT, the service-based network configured to interface with the RAN. The operations of 1405 may be performed in accordance with examples as disclosed herein. In some examples, aspects of the operations of 1405 may be performed by a control signaling receiving manager 825 as described with reference to FIG. 8.

At 1410, the method may include transmitting, via the first RAT and based at least in part on the control information, a service request indicating the core network service offered by the service-based network associated with the second RAT. The operations of 1410 may be performed in accordance with examples as disclosed herein. In some examples, aspects of the operations of 1410 may be performed by a service request transmitting manager 830 as described with reference to FIG. 8.

At 1415, the method may include receiving, from the DU, control signaling indicating a service configuration for communicating with the core network service offered by the service-based network based at least in part on the service request, the service configuration indicating a destination associated with the core network service. The operations of 1415 may be performed in accordance with examples as disclosed herein. In some examples, aspects of the operations of 1415 may be performed by a control signaling receiving manager 825 as described with reference to FIG. 8.

At 1420, the method may include transmitting, to the DU via the first RAT and in accordance with the service configuration, a service message including the destination and payload associated with the core network service, the payload in a format associated with the second RAT. The operations of 1420 may be performed in accordance with examples as disclosed herein. In some examples, aspects of the operations of 1420 may be performed by a service message transmitting manager 835 as described with reference to FIG. 8.

FIG. 15 illustrates a flowchart showing a method 1500 that supports techniques for establishing connectivity to a service-based network via a RAN in accordance with one or more aspects of the present disclosure. The operations of the method 1500 may be implemented by a network entity or its components as described herein. For example, the operations of the method 1500 may be performed by a network entity as described with reference to FIGS. 1 through 6 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include receiving a service message from a core network service offered by a service-based network associated with a second RAT, where the service-based network is configured to interface with a RAN associated with the first RAT, the service message indicating a service context associated with the second RAT for communications between the UE and the core network service. The operations of 1505 may be performed in accordance with examples as disclosed herein. In some examples, aspects of the operations of 1505 may be performed by a service message receiving manager 1225 as described with reference to FIG. 12.

At 1510, the method may include determining, based at least in part on the service context associated with the second RAT, a service configuration for communicating with the UE via the first RAT. The operations of 1510 may be performed in accordance with examples as disclosed herein. In some examples, aspects of the operations of 1510 may be performed by a service configuration manager 1230 as described with reference to FIG. 12.

At 1515, the method may include transmitting the service message to the UE via the first RAT and in accordance with the service configuration, the service message including a payload in a format associated with the second RAT. The operations of 1515 may be performed in accordance with examples as disclosed herein. In some examples, aspects of the operations of 1515 may be performed by a service message transmitting manager 1235 as described with reference to FIG. 12.

FIG. 16 illustrates a flowchart showing a method 1600 that supports techniques for establishing connectivity to a service-based network via a RAN in accordance with one or more aspects of the present disclosure. The operations of the method 1600 may be implemented by a network entity or its components as described herein. For example, the operations of the method 1600 may be performed by a network entity as described with reference to FIGS. 1 through 6 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include receiving a service message from a core network service offered by a service-based network associated with a second RAT, where the service-based network is configured to interface with a RAN associated with the first RAT, the service message indicating a service context associated with the second RAT for communications between the UE and the core network service. The operations of 1605 may be performed in accordance with examples as disclosed herein. In some examples, aspects of the operations of 1605 may be performed by a service message receiving manager 1225 as described with reference to FIG. 12.

At 1610, the method may include receiving, from the core network service via the service message, a service configuration request for converting the service context associated with the second RAT to the service configuration associated with the first RAT. The operations of 1610 may be performed in accordance with examples as disclosed herein. In some examples, aspects of the operations of 1610 may be performed by a service configuration request receiving manager 1240 as described with reference to FIG. 12.

At 1615, the method may include determining, based on the service context associated with the second RAT, a service configuration for communicating with the UE via the first RAT, where determining the service configuration is based at least in part on receiving the service configuration request. The operations of 1615 may be performed in accordance with examples as disclosed herein. In some examples, aspects of the operations of 1615 may be performed by a service configuration manager 1230 as described with reference to FIG. 12.

At 1620, the method may include transmitting the service message to the UE via the first RAT and in accordance with the service configuration, the service message including a payload in a format associated with the second RAT, where transmitting the service message is based at least in part on receiving the service configuration request. The operations of 1620 may be performed in accordance with examples as disclosed herein. In some examples, aspects of the operations of 1620 may be performed by a service message transmitting manager 1235 as described with reference to FIG. 12.

The following provides an overview of aspects of the present disclosure:

Aspect 1: A method for wireless communication at a UE, comprising: receiving, from a DU associated with a first RAT of a RAN, control information indicating a core network service offered by a service-based network associated with a second RAT, the service-based network configured to interface with the RAN; transmitting, via the first RAT and based at least in part on the control information, a service request indicating the core network service offered by the service-based network associated with the second RAT; receiving, from the DU, control signaling indicating a service configuration for communicating with the core network service offered by the service-based network based at least in part on the service request, the service configuration indicating a destination associated with the core network service; and transmitting, to the DU via the first RAT and in accordance with the service configuration, a service message comprising the destination and payload associated with the core network service, the payload in a format associated with the second RAT.

Aspect 2: The method of aspect 1, further comprising: receiving, from the DU, a SIB message comprising the control information, wherein the SIB message is received via the first RAT.

Aspect 3: The method of any of aspects 1 through 2, further comprising: transmitting, to the DU via the first RAT, capability signaling indicating a capability of the UE to communicate with core network services offered by the service-based network associated with the second RAT, wherein receiving the control information is based at least in part on the capability signaling.

Aspect 4: The method of any of aspects 1 through 3, further comprising: establishing, based at least in part on operating in a dual connectivity state, a wireless connection with a second DU associated with the second RAT, wherein the second DU is communicatively couplable to at least a second core network service offered by the service-based network; and transmitting, to the second DU via the second RAT, a second service message comprising a second destination associated with the second core network service, the service message further comprising additional service data associated with the second core network service, the additional service data comprising an additional payload in the format associated with the second RAT.

Aspect 5: The method of aspect 4, further comprising: receiving, from the second DU, second control signaling indicating a service context for communicating with the second core network service via the second RAT, wherein the second service message is transmitted in accordance with the service context.

Aspect 6: The method of any of aspects 1 through 5, wherein the service request and the service message are transmitted via one or more communication layers associated with the first RAT, the one or more communication layers comprising a PHY layer, a MAC layer, an RLD layer, or any combination thereof.

Aspect 7: The method of any of aspects 1 through 6, wherein the service request, the service message, or both, are transmitted to the DU for relay to the destination associated with the core network service.

Aspect 8: The method of any of aspects 1 through 7, wherein the first RAT comprises a 5G RAT, an NR access technology, or both, and the second RAT comprises a 6G RAT.

Aspect 9: A method for wireless communications at a DU configured to communicate with a UE via a first RAT, the method comprising: receiving a service message from a core network service offered by a service-based network associated with a second RAT, wherein the service-based network is configured to interface with a RAN associated with the first RAT, the service message indicating a service context associated with the second RAT for communications between the UE and the core network service; determining, based at least in part on the service context associated with the second RAT, a service configuration for communicating with the UE via the first RAT; and transmitting the service message to the UE via the first RAT and in accordance with the service configuration, the service message comprising a payload in a format associated with the second RAT.

Aspect 10: The method of aspect 9, further comprising: receiving, from the core network service via the service message, a service configuration request for converting the service context associated with the second RAT to the service configuration associated with the first RAT, wherein determining the service configuration and transmitting the service message are based at least in part on receiving the service configuration request.

Aspect 11: The method of any of aspects 9 through 10, further comprising: transmitting, to the UE via the first RAT, a SIB message indicating the core network service offered by the service-based network; receiving, from the UE via the first RAT and based at least in part on the SIB message, a service request indicating the core network service; and transmitting the service request to a destination associated with the core network service and via the second RAT, wherein receiving the service message is based at least in part on transmitting the service request.

Aspect 12: The method of aspect 11, further comprising: receiving, from the UE via the first RAT, capability signaling indicating a capability of the UE to communicate with core network services offered by the service-based network associated with the second RAT, wherein transmitting the SIB message is based at least in part on the capability signaling.

Aspect 13: The method of any of aspects 9 through 12, wherein the service message is received via an adaptor component of the DU, the adaptor component is configured to interface with the service-based network and translate communications between the first RAT and the second RAT, the adaptor component comprises hardware components, software components, or both.

Aspect 14: The method of any of aspects 9 through 13, further comprising: transmitting, the core network service, control signaling indicating application programming interface information associated with the DU, wherein the service message is received via the second RAT in accordance with the application programming interface information.

Aspect 15: The method of any of aspects 9 through 14, wherein the service message is transmitted via one or more communication layers associated with the first RAT, the one or more communication layers comprising a PHY layer, a MAC layer, an RLD layer, or any combination thereof.

Aspect 16: The method of any of aspects 9 through 15, wherein the first RAT comprises a 5G RAT, an NR access technology, or both, and the second RAT comprises a 6G RAT.

Aspect 17: An apparatus comprising a processor; memory coupled with the processor; and instructions stored in the memory and executable by the processor to cause the apparatus to perform a method of any of aspects 1 through 8.

Aspect 18: An apparatus comprising at least one means for performing a method of any of aspects 1 through 8.

Aspect 19: A non-transitory computer-readable medium storing code the code comprising instructions executable by a processor to perform a method of any of aspects 1 through 8.

Aspect 20: An apparatus comprising a processor; memory coupled with the processor; and instructions stored in the memory and executable by the processor to cause the apparatus to perform a method of any of aspects 9 through 16.

Aspect 21: An apparatus comprising at least one means for performing a method of any of aspects 9 through 16.

Aspect 22: A non-transitory computer-readable medium storing code the code comprising instructions executable by a processor to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
at least one processor; and
at least one memory coupled with the at least one processor, the at least one memory storing instructions executable by the at least one processor to cause the apparatus to:
receive, from a distributed unit associated with a first radio access technology of a radio access network (RAN), control information indicating a core network service offered by a service-based network associated with a second radio access technology, the service-based network configured to interface with the RAN;
transmit, via the first radio access technology and based at least in part on the control information, a service request indicating the core network service offered by the service-based network associated with the second radio access technology;
receive, from the distributed unit, control signaling indicating a service configuration for communicating with the core network service offered by the service-based network based at least in part on the service request, the service configuration indicating a destination associated with the core network service; and
transmit, to the distributed unit via the first radio access technology and in accordance with the service configuration, a service message comprising the destination and payload associated with the core network service, the payload in a format associated with the second radio access technology.

2. The apparatus of claim 1, wherein the instructions are further executable by the at least one processor to cause the apparatus to:
receive, from the distributed unit, a system information block message comprising the control information, wherein the system information block message is received via the first radio access technology.

3. The apparatus of claim 1, wherein the instructions are further executable by the at least one processor to cause the apparatus to:
transmit, to the distributed unit via the first radio access technology, capability signaling indicating a capability of the UE to communicate with core network services offered by the service-based network associated with the second radio access technology, wherein receiving the control information is based at least in part on the capability signaling.

4. The apparatus of claim 1, wherein the instructions are further executable by the at least one processor to cause the apparatus to:

establish, based at least in part on operating in a dual connectivity state, a wireless connection with a second distributed unit associated with the second radio access technology, wherein the second distributed unit is communicatively couplable to at least a second core network service offered by the service-based network; and
transmit, to the second distributed unit via the second radio access technology, a second service message comprising a second destination associated with the second core network service, the service message further comprising additional service data associated with the second core network service, the additional service data comprising an additional payload in the format associated with the second radio access technology.

5. The apparatus of claim 4, wherein the instructions are further executable by the at least one processor to cause the apparatus to:
receive, from the second distributed unit, second control signaling indicating a service context for communicating with the second core network service via the second radio access technology, wherein the second service message is transmitted in accordance with the service context.

6. The apparatus of claim 1, wherein the service request and the service message are transmitted via one or more communication layers associated with the first radio access technology, the one or more communication layers comprising a physical layer, a medium access control layer, a radio link control layer, or any combination thereof.

7. The apparatus of claim 1, wherein the service request, the service message, or both, are transmitted to the distributed unit for relay to the destination associated with the core network service.

8. The apparatus of claim 1, wherein the first radio access technology comprises a Fifth Generation (5G) radio access technology, a New Radio (NR) access technology, or both, and wherein the second radio access technology comprises a Sixth Generation (6G) radio access technology.

9. An apparatus for wireless communication at a distributed unit configured to communicate with a user equipment (UE) via a first radio access technology, the apparatus comprising:
at least one processor; and
at least one memory coupled with the at least one processor, the at least one memory storing instructions executable by the at least one processor to cause the apparatus to:
receive a service message from a core network service offered by a service-based network associated with a second radio access technology, wherein the service-based network is configured to interface with a radio access network (RAN) associated with the first radio access technology, the service message indicating a service context associated with the second radio access technology for communications between the UE and the core network service;
determine, based at least in part on the service context associated with the second radio access technology, a service configuration for communicating with the UE via the first radio access technology; and
transmit the service message to the UE via the first radio access technology and in accordance with the service configuration, the service message comprising a payload in a format associated with the second radio access technology.

10. The apparatus of claim 9, wherein the instructions are further executable by the at least one processor to cause the apparatus to:

receive, from the core network service via the service message, a service configuration request for converting the service context associated with the second radio access technology to the service configuration associated with the first radio access technology, wherein determining the service configuration and transmitting the service message are based at least in part on receiving the service configuration request.

11. The apparatus of claim 9, wherein the instructions are further executable by the at least one processor to cause the apparatus to:

transmit, to the UE via the first radio access technology, a system information block message indicating the core network service offered by the service-based network;

receive, from the UE via the first radio access technology and based at least in part on the system information block message, a service request indicating the core network service; and transmit the service request to a destination associated with the core network service and via the second radio access technology, wherein receiving the service message is based at least in part on transmitting the service request.

12. The apparatus of claim 11, wherein the instructions are further executable by the at least one processor to cause the apparatus to:

receive, from the UE via the first radio access technology, capability signaling indicating a capability of the UE to communicate with core network services offered by the service-based network associated with the second radio access technology, wherein transmitting the system information block message is based at least in part on the capability signaling.

13. The apparatus of claim 9, wherein the service message is received via an adaptor component of the distributed unit, wherein the adaptor component is configured to interface with the service-based network and translate communications between the first radio access technology and the second radio access technology, wherein the adaptor component comprises hardware components, software components, or both.

14. The apparatus of claim 9, wherein the instructions are further executable by the at least one processor to cause the apparatus to:

transmit, to the core network service, control signaling indicating application programming interface information associated with the distributed unit, wherein the service message is received via the second radio access technology in accordance with the application programming interface information.

15. The apparatus of claim 9, wherein the service message is transmitted via one or more communication layers associated with the first radio access technology, the one or more communication layers comprising a physical layer, a medium access control layer, a radio link control layer, or any combination thereof.

16. The apparatus of claim 9, wherein the first radio access technology comprises a Fifth Generation (5G) radio access technology, a New Radio (NR) access technology, or both, and wherein the second radio access technology comprises a Sixth Generation (6G) radio access technology.

17. A method for wireless communication at a user equipment (UE), comprising:

receiving, from a distributed unit associated with a first radio access technology of a radio access network (RAN), control information indicating a core network service offered by a service-based network associated with a second radio access technology, the service-based network configured to interface with the RAN;

transmitting, via the first radio access technology and based at least in part on the control information, a service request indicating the core network service offered by the service-based network associated with the second radio access technology;

receiving, from the distributed unit, control signaling indicating a service configuration for communicating with the core network service offered by the service-based network based at least in part on the service request, the service configuration indicating a destination associated with the core network service; and transmitting, to the distributed unit via the first radio access technology and in accordance with the service configuration, a service message comprising the destination and payload associated with the core network service, the payload in a format associated with the second radio access technology.

18. The method of claim 17, further comprising:

receiving, from the distributed unit, a system information block message comprising the control information, wherein the system information block message is received via the first radio access technology.

19. The method of claim 17, further comprising:

transmitting, to the distributed unit via the first radio access technology, capability signaling indicating a capability of the UE to communicate with core network services offered by the service-based network associated with the second radio access technology, wherein receiving the control information is based at least in part on the capability signaling.

20. The method of claim 17, further comprising:

establishing, based at least in part on operating in a dual connectivity state, a wireless connection with a second distributed unit associated with the second radio access technology, wherein the second distributed unit is communicatively couplable to at least a second core network service offered by the service-based network; and transmitting, to the second distributed unit via the second radio access technology, a second service message comprising a second destination associated with the second core network service, the service message further comprising additional service data associated with the second core network service, the additional service data comprising an additional payload in the format associated with the second radio access technology.

21. The method of claim 20, further comprising:

receiving, from the second distributed unit, second control signaling indicating a service context for communicating with the second core network service via the second radio access technology, wherein the second service message is transmitted in accordance with the service context.

22. The method of claim 17, wherein the service request and the service message are transmitted via one or more communication layers associated with the first radio access technology, the one or more communication layers comprising a physical layer, a medium access control layer, a radio link control layer, or any combination thereof.

23. The method of claim 17, wherein the service request, the service message, or both, are transmitted to the distributed unit for relay to the destination associated with the core network service.

24. The method of claim 17, wherein the first radio access technology comprises a Fifth Generation (5G) radio access technology, a New Radio (NR) access technology, or both, and wherein the second radio access technology comprises a Sixth Generation (6G) radio access technology.

25. A method for wireless communications at a distributed unit configured to communicate with a user equipment (UE) via a first radio access technology, the method comprising:

receiving a service message from a core network service offered by a service-based network associated with a second radio access technology, wherein the service-based network is configured to interface with a radio access network (RAN) associated with the first radio access technology, the service message indicating a service context associated with the second radio access technology for communications between the UE and the core network service;

determining, based at least in part on the service context associated with the second radio access technology, a service configuration for communicating with the UE via the first radio access technology; and transmitting the service message to the UE via the first radio access technology and in accordance with the service configuration, the service message comprising a payload in a format associated with the second radio access technology.

26. The method of claim 25, further comprising:

receiving, from the core network service via the service message, a service configuration request for converting the service context associated with the second radio access technology to the service configuration associated with the first radio access technology, wherein determining the service configuration and transmitting the service message are based at least in part on receiving the service configuration request.

27. The method of claim 25, further comprising:

transmitting, to the UE via the first radio access technology, a system information block message indicating the core network service offered by the service-based network;

receiving, from the UE via the first radio access technology and based at least in part on the system information block message, a service request indicating the core network service; and transmitting the service request to a destination associated with the core network service and via the second radio access technology, wherein receiving the service message is based at least in part on transmitting the service request.

28. The method of claim 27, further comprising:

receiving, from the UE via the first radio access technology, capability signaling indicating a capability of the UE to communicate with core network services offered by the service-based network associated with the second radio access technology, wherein transmitting the system information block message is based at least in part on the capability signaling.

29. The method of claim 25, wherein the service message is received via an adaptor component of the distributed unit, wherein the adaptor component is configured to interface with the service-based network and translate communications between the first radio access technology and the second radio access technology, wherein the adaptor component comprises hardware components, software components, or both.

30. The method of claim 25, further comprising:

transmitting, the core network service, control signaling indicating application programming interface information associated with the distributed unit, wherein the service message is received via the second radio access technology in accordance with the application programming interface information.

* * * * *